United States Patent
Lau et al.

(10) Patent No.: US 6,632,407 B1
(45) Date of Patent: *Oct. 14, 2003

(54) PERSONAL ELECTRO-KINETIC AIR TRANSPORTER-CONDITIONER

(75) Inventors: Shek Fai Lau, Foster City, CA (US); Charles E. Taylor, Sebastopol, CA (US)

(73) Assignee: Sharper Image Corporation, San Francisco, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 09/669,253

(22) Filed: Sep. 25, 2000

Related U.S. Application Data

(63) Continuation-in-part of application No. 09/186,471, filed on Nov. 5, 1998, now Pat. No. 6,176,977.

(51) Int. Cl.$^7$ .............................................. B01J 19/08
(52) U.S. Cl. ................ 422/186; 422/186.07; 422/186.1
(58) Field of Search ............................ 422/186, 186.07, 422/186.1; 204/176; 210/739, 740

(56) References Cited

U.S. PATENT DOCUMENTS

| | | | |
|---|---|---|---|
| 2,327,588 A | 8/1943 | Bennett | 315/326 |
| 2,590,447 A | 3/1952 | Nord, Jr. et al. | |
| 2,949,550 A | 8/1960 | Brown | 310/5 |
| 3,981,695 A | 9/1976 | Fuchs | 55/138 |
| 3,984,215 A | 10/1976 | Zucker | 55/2 |
| 4,052,177 A | 10/1977 | Kide | 55/139 |
| 4,138,233 A | 2/1979 | Masuda | 55/139 |
| 4,209,306 A | 6/1980 | Feldman et al. | 55/2 |
| 4,227,894 A | 10/1980 | Proynoff | 96/58 |
| 4,231,766 A | 11/1980 | Spurgin | 55/138 |
| 4,232,355 A | 11/1980 | Finger et al. | 361/235 |
| 4,244,712 A | 1/1981 | Tongret | 55/124 |
| 4,259,452 A * | 3/1981 | Yukuta et al. | 521/127 |
| 4,266,948 A | 5/1981 | Teague et al. | 55/126 |
| 4,282,014 A | 8/1981 | Winkler et al. | 55/105 |
| 4,342,571 A | 8/1982 | Hayashi | 55/137 |
| 4,386,395 A | 5/1983 | Francis, Jr. | 363/27 |
| 4,413,225 A | 11/1983 | Donig et al. | 323/246 |

(List continued on next page.)

FOREIGN PATENT DOCUMENTS

| | | | |
|---|---|---|---|
| FR | 002690509 A1 * | 10/1993 | F24D/7/00 |
| JP | 10137007 | 5/1998 | |
| JP | 11104223 | 4/1999 | |
| JP | 2000236914 | 9/2000 | |
| WO | WO 01/47803 A1 | 7/2001 | |
| WO | WO 01/48781 A2 | 7/2001 | |

OTHER PUBLICATIONS

Co–pending Application, Ser. No. 09/730,499.*

(List continued on next page.)

*Primary Examiner*—James J. Seidleck
*Assistant Examiner*—Thao Tran
(74) *Attorney, Agent, or Firm*—Fliesler Dubb Meyer & Lovejoy, LLP

(57) ABSTRACT

A personal electro-kinetic electrostatic air conditioner includes a self-contained ion generator that provides electro-kinetically moved air with ions and safe amounts of ozone, and includes a water retaining element to increase humidity of the output air flow. The ion generator includes a high voltage pulse generator whose output pulses are coupled between first and second electrode arrays. Preferably the first electrode array includes first and second pointed electrodes, and the second electrode array includes annular-like electrodes having a central opening coaxial with the associated pointed electrode. The surface of the annular-like electrodes is smooth and continuous through the opening and into a collar region through which the air flows. A water retaining member is disposed surrounding the output airflow to increase humidity of the output air, which is substantially cleansed of particulate matter, and contains safe amounts of ozone.

24 Claims, 14 Drawing Sheets

U.S. PATENT DOCUMENTS

| | | | |
|---|---|---|---|
| 4,445,911 A | 5/1984 | Lind | 55/2 |
| 4,477,263 A | 10/1984 | Shaver et al. | 95/7 |
| 4,496,375 A | 1/1985 | Le Vantine | 96/66 |
| 4,502,002 A | 2/1985 | Ando | 323/237 |
| 4,536,698 A | 8/1985 | Shevalenko et al. | 323/237 |
| 4,587,475 A | 5/1986 | Finney, Jr. et al. | 323/241 |
| 4,600,411 A | 7/1986 | Santamaria | 55/139 |
| 4,601,733 A | 7/1986 | Ordines et al. | 55/139 |
| 4,626,261 A | 12/1986 | Jorgensen | 55/2 |
| 4,632,135 A | 12/1986 | Lenting et al. | |
| 4,643,745 A | 2/1987 | Sakakibara et al. | 96/76 |
| 4,659,342 A | 4/1987 | Lind | 55/2 |
| 4,674,003 A | 6/1987 | Zylka | 361/235 |
| 4,694,376 A | 9/1987 | Gesslauer | 361/235 |
| 4,713,093 A | 12/1987 | Hansson | 55/139 |
| 4,713,724 A | 12/1987 | Voelkel | 361/231 |
| 4,779,182 A | 10/1988 | Mickal et al. | 363/37 |
| 4,789,801 A | 12/1988 | Lee | |
| 4,808,200 A | 2/1989 | Dallhammer et al. | 55/105 |
| 4,811,159 A | 3/1989 | Foster, Jr. | 361/231 |
| 4,940,470 A | 7/1990 | Jaisinghani et al. | 55/2 |
| 4,941,068 A | 7/1990 | Hofmann | 361/231 |
| 5,010,869 A | 4/1991 | Lee | 123/539 |
| 5,024,685 A | 6/1991 | Torok et al. | 96/43 |
| 5,072,746 A | 12/1991 | Kantor | |
| 5,141,529 A | 8/1992 | Oakley et al. | 95/57 |
| 5,196,171 A | 3/1993 | Peltier | 422/121 |
| 5,215,558 A | 6/1993 | Moon | 96/62 |
| 5,217,504 A | 6/1993 | Johansson | 55/2 |
| 5,302,190 A | 4/1994 | Williams | 95/57 |
| 5,315,838 A | 5/1994 | Thompson | 62/129 |
| 5,316,741 A | 5/1994 | Sewell et al. | 422/186.21 |
| 5,378,978 A | 1/1995 | Gallo et al. | 323/241 |
| 5,386,839 A | 2/1995 | Chen | |
| 5,484,472 A | 1/1996 | Weinberg | 96/26 |
| 5,535,089 A | 7/1996 | Ford et al. | 361/231 |
| 5,569,368 A | 10/1996 | Larsky et al. | |
| 5,578,112 A | 11/1996 | Krause | 96/24 |
| 5,601,636 A | 2/1997 | Glucksman | 96/63 |
| 5,656,063 A | 8/1997 | Hsu | 95/58 |
| 5,667,564 A | 9/1997 | Weinberg | 96/58 |
| 5,702,507 A | 12/1997 | Wang | 96/55 |
| 5,779,769 A | 7/1998 | Jiang | 96/55 |
| 5,814,135 A | 9/1998 | Weinberg | 96/58 |
| 5,879,435 A | 3/1999 | Satyapal et al. | 96/16 |
| 5,893,977 A * | 4/1999 | Pucci | 210/243 |
| 5,911,957 A | 6/1999 | Khatchatrian et al. | 422/186.07 |
| 5,972,076 A | 10/1999 | Nichols et al. | 95/81 |
| 5,975,090 A | 11/1999 | Taylor et al. | 132/116 |
| 6,019,815 A | 2/2000 | Satyapal et al. | 95/74 |
| 6,042,637 A | 3/2000 | Weinberg | 96/58 |
| 6,063,168 A | 5/2000 | Nichols et al. | 96/80 |
| 6,086,657 A | 7/2000 | Freije | 95/2 |
| 6,126,722 A * | 10/2000 | Mitchell et al. | 361/226 |
| 6,149,717 A | 11/2000 | Satyapal et al. | 96/16 |
| 6,149,815 A | 11/2000 | Sauter | 210/635 |
| 6,152,146 A | 11/2000 | Taylor et al. | 132/116 |
| 6,163,098 A * | 12/2000 | Taylor et al. | 310/308 |
| 6,176,977 B1 * | 1/2001 | Taylor et al. | 123/539 |
| 5,484,472 C1 | 2/2001 | Weinberg | 96/26 |
| 6,182,461 B1 | 2/2001 | Washburn et al. | 62/264 |
| 6,182,671 B1 | 2/2001 | Taylor et al. | 132/116 |
| 6,193,852 B1 | 2/2001 | Caracciolo et al. | 204/276 |
| 6,212,883 B1 | 4/2001 | Kang | 60/275 |
| 6,252,012 B1 | 6/2001 | Egitto et al. | 525/431 |
| 6,270,733 B1 | 8/2001 | Rodden | 422/186.07 |
| 6,277,248 B1 | 8/2001 | Ishioka et al. | 204/176 |
| D449,679 S | 10/2001 | Smith et al. | D23/365 |
| D499,097 | 10/2001 | Smith et al. | D23/364 |
| 6,302,944 B1 | 10/2001 | Hoenig | 96/16 |
| 6,309,514 B1 | 10/2001 | Conrad et al. | 204/164 |
| 6,312,507 B1 | 11/2001 | Taylor et al. | |
| 6,315,821 B1 | 11/2001 | Pillion et al. | 96/416 |
| 6,328,791 B1 | 12/2001 | Pillion et al. | 96/418 |
| 6,350,417 B1 | 2/2002 | Lau et al. | 422/186.04 |
| 6,372,097 B1 | 4/2002 | Chen | 204/176 |
| 6,379,427 B1 | 4/2002 | Siess | 95/57 |
| 6,391,259 B1 | 5/2002 | Malkin et al. | 422/28 |
| 6,544,485 B1 | 4/2003 | Taylor | |

OTHER PUBLICATIONS

Co-pending Application, Ser. No. 09/897,267.*
Co-pending Application, Ser. No. 10/023,197.*
Co-pending Application, Ser. No. 10/023,460.*
Co-pending Application 10/188,668 filed Jul. 2, 2002.*
"Zenion Elf Device" drawing.
Electrical Schematic and promotional material availabile from Zenion Industries, 7 pgs. (Aug. 1990).
Promotional material available from Zenion Industries for the Plasma–Pure 100/200/300, 2 pgs. (Aug. 1990).
Promotional material available from Zenion Industries for the Plasma–Tron, 2 pgs. (Aug. 1990).
Electrical Schematic and promotional material available from Zenion Industries, 7 pages, Aug., 1990.
U.S. patent application Ser. No. 09/197,131, Taylor et al., filed Nov. 20, 1998.
U.S. patent application Ser. No. 09/742,814, Taylor et al., filed Dec. 19, 2000.
U.S. patent application Ser. No. 09/669,253, Taylor et al., filed Sep. 25, 2000.
U.S. patent application Ser. No. 09/669,268, Taylor et al., filed Sep. 25, 2000.
U.S. patent application Ser. No. 09/924,624, Taylor et al., filed Aug. 8, 2001.
U.S. patent application Ser. No. 09/924,600, Taylor et al., filed Aug. 8, 2001.
U.S. patent application Ser. No. 10/074,082, Taylor et al., filed Feb. 12, 2002.
U.S. patent application Ser. No. 10/074,209, Taylor et al., filed Feb. 12, 2002.
U.S. patent application Ser. No. 10/074,207, Taylor et al., filed Feb. 12, 2002.
U.S. patent application Ser. No. 10/074,208. Tayor, filed Feb. 12, 2002.
U.S. patent application Ser. No. 10/074,339, Taylor et al., filed Feb. 12, 2002.
U.S. patent application Ser. No. 10/074,827, McKinney, Jr. et al., filed Feb. 12, 2002.
U.S. patent application Ser. No. 10/074,549, Sinaiko et al., filed Feb. 12, 2002.
U.S. patent application Ser. No. 10/074,103, Sinaiko et al., filed Feb. 12, 2002.
U.S. patent application Ser. No. 10/074,096, Taylor et al., filed Feb. 12, 2002.
U.S. patent application Ser. No. 10/074,347, Taylor et al., filed Feb. 12, 2002.
U.S. patent application Ser. No. 10/074,379, Taylor et al., filed Feb. 12, 2002.
U.S. patent application Ser. No. 10/156,158, Taylor et al., filed May 28, 2002.
U.S. patent application Ser. No. 10/188,668, Taylor et al., filed Jul. 2, 2002.
LENTEK Silā™ Plug–In Air Purifier/Deodorizer product box copyrighted 1999.

* cited by examiner

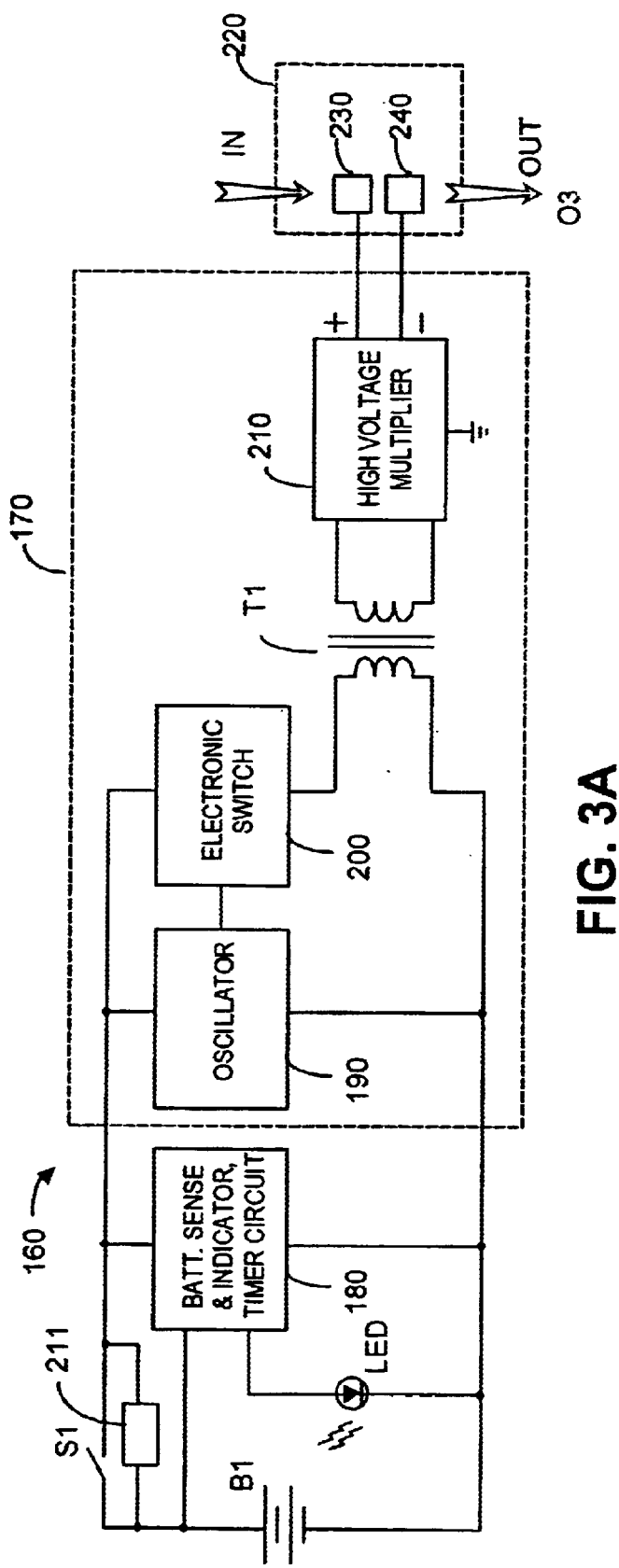
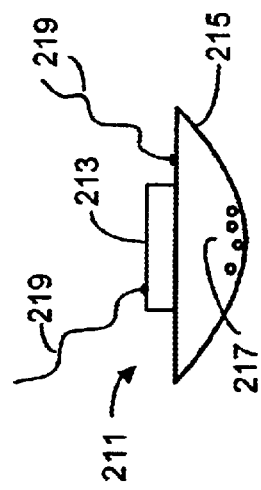
FIG. 3A
FIG. 3B

PERSONAL ELECTRO-KINETIC AIR TRANSPORTER-CONDITIONER

RELATION TO CO-PENDING APPLICATION

This application is a continuation-in-part from applicants' pending U.S. patent application Ser. No. 09/186,471 filed Nov. 5, 1998 now U.S. Pat. No. 6,176,977 entitled ELECTRO-KINETIC AIR TRANSPORTER-CONDITIONER, and assigned to the assignee herein.

FIELD OF THE INVENTION

This invention relates to electro-kinetic conversion of electrical energy into fluid flow of an ionizable dielectric medium in which an electro-kinetically produced flow of air is created, the air containing safe amounts of ozone and from which air particulate matter has been substantially removed, and more particularly to portable such units adapted for use in a confined area in which some degree of humidity control is desired.

BACKGROUND OF THE INVENTION

The use of an electric motor to rotate a fan blade to create an air flow has long been known in the art. Unfortunately, such fans produce substantial noise, and can present a hazard to children who may be tempted to poke a finger or a pencil into the moving fan blade. Although such fans can produce substantial air flow, e.g., 1,000 ft$^3$/minute or more, substantial electrical power is required to operate the motor, and essentially no conditioning of the flowing air occurs.

It is known to provide such fans with a HEPA-compliant filter element to remove particulate matter larger than perhaps 0.3 $\mu$m. Unfortunately, the resistance to air flow presented by the filter element may require doubling the electric motor size to maintain a desired level of airflow. Further, HEPA-compliant filter elements are expensive, and can represent a substantial portion of the sale price of a HEPA-compliant filter-fan unit. While such filter-fan units can condition the air by removing large particles, particulate matter small enough to pass through the filter element is not removed, including bacteria, for example.

It is also known in the art to produce an air flow using electro-kinetic techniques, by which electrical power is directly converted into a flow of air without mechanically moving components. One such system is described in U.S. Pat. No. 4,789,801 to Lee (1988), depicted herein in simplified form as FIGS. 1A and 1B. Lee's system 10 includes an array of small area ("minisectional") electrodes 20 that is spaced-apart symmetrically from an array of larger area ("maxisectional") electrodes 30. The positive terminal of a pulse generator 40 that outputs a train of high voltage pulses (e.g., 0 to perhaps +5 KV) is coupled to the minisectional array, and the negative pulse generator terminal is coupled to the maxisectional array.

The high voltage pulses ionize the air between the arrays, and an air flow 50 from the minisectional array toward the maxisectional array results, without requiring any moving parts. Particulate matter 60 in the air is entrained within the airflow 50 and also moves towards the maxisectional electrodes 30. Much of the particulate matter is electrostatically attracted to the surface of the maxisectional electrode array, where it remains, thus conditioning the flow of air exiting system 10. Further, the high voltage field present between the electrode arrays can release ozone into the ambient environment, which appears to destroy or at least alter whatever is entrained in the airflow, including for example, bacteria.

In the embodiment of FIG. 1A, minisectional electrodes 20 are circular in cross-section, having a diameter of about 0.003" (0.08 mm), whereas the maxisectional electrodes 30 are substantially larger in area and define a "teardrop" shape in cross-section. The ratio of cross-sectional areas between the maxisectional and minisectional electrodes is not explicitly stated, but from Lee's figures appears to exceed 10:1. As shown in FIG. 1A herein, the bulbous front surfaces of the maxisectional electrodes face the minisectional electrodes, and the somewhat sharp trailing edges face the exit direction of the air flow. The "sharpened" trailing edges on the maxisectional electrodes apparently promote good electrostatic attachment of particular matter entrained in the airflow and help airflow. Lee does not disclose how the teardrop shaped maxisectional electrodes are fabricated, but presumably they are produced using a relatively expensive mold-casting or an extrusion process.

In another embodiment shown herein as FIG. 1B, Lee's maxisectional sectional electrodes 30 are symmetrical and elongated in cross-section. The elongated trailing edges on the maxisectional electrodes provide increased area upon which particulate matter entrained in the airflow can attach. Lee states that precipitation efficiency and desired reduction of anion release into the environment can result from including a passive third array of electrodes 70. Understandably, increasing efficiency by adding a third array of electrodes will contribute to the cost of manufacturing and maintaining the resultant system.

While the electrostatic techniques disclosed by Lee are advantageous to conventional electric fan-filter units, Lee's maxisectional electrodes are relatively expensive to fabricate. Increased filter efficiency beyond what Lee's embodiments can produce would be advantageous, especially without including a third array of electrodes. Further, Lee's system does not provide for changing the moisture content of the output flow of air, and does not lend itself to being fabricated in a small form factor, for example hand holdable.

While a Lee-type system may be useful in a room, it does not lend itself to portability, for example for use in a confined relatively small area such as the seating compartment of a motor vehicle or an airplane.

Thus, there is a need for a portable electro-kinetic air transporter-conditioner that provides improved efficiency over Lee-type systems, without requiring expensive production techniques to fabricate the electrodes. Preferably such a conditioner should function efficiently without requiring a third array of electrodes. Such a conditioner should permit user-selection of safe amounts of ozone to be generated, for example to remove odor from the ambient environment, and should be implementable in a hand held form factor so as to be portable. Further, such a conditioner should permit increasing the moisture content of the output airflow.

The present invention provides a method and portable apparatus for electro-kinetically transporting and conditioning air.

SUMMARY OF THE PRESENT INVENTION

The present invention provides a preferably portable electro-kinetic system for transporting and conditioning air without moving parts. The air is conditioned in the sense that it is ionized and contains safe amounts of ozone, and, optionally, can benefit from augmented moisture content or aromatic content. Indeed users who are asthmatics may wish to provide the invention with an asthma inhalant that is added to the outflow of clean air, for their personal benefit.

Applicants' electro-kinetic air transporter-conditioner includes a housing with at least one vent through which ambient air may enter, and an ionizer unit disposed within the housing. The ionizer unit includes a high voltage DC inverter that boosts low voltage (e.g., perhaps 6 VDC to about 12 VDC) to high voltage DC, and a generator that receives the high voltage DC and outputs high voltage pulses. The high voltage pulses are perhaps 10 KV peak-to-peak, although an essentially 100% duty cycle (e.g., high voltage DC) output could be used instead of pulses. The unit also includes at least one and preferably two electrode assembly units, each unit comprising spaced-apart first and second arrays of conducting electrodes coupled between the positive and negative output ports of the high voltage generator. Preferably at least one moisture-containing member is disposed adjacent a downstream region of each second-array electrodes so as to increase humidity of the output airstream.

Preferably two electrode assemblies are used, in which each assembly is formed using first and second arrays of readily manufacturable electrode types. In one embodiment, the first array comprises wire-like electrodes and the second array comprises "U"-shaped electrodes having one or two trailing surfaces. In a preferred, even more efficient embodiment, each first array includes at least one pin or cone-like electrode and the second array is an annular washer-like electrode. The electrode assemblies may comprise various combinations of the described first and second array electrodes. In the various embodiments, the ratio between effective radius of the second array electrodes to the first array electrodes is at least about 20:1.

The high voltage pulses create an electric field between the first and second electrode arrays in each electrode assembly. This field produces an electro-kinetic airflow going from the first array toward the second array, the airflow being rich in preferably a net surplus of negative ions and in ozone.

Ambient air including dust particles and other undesired components (germs, perhaps) enter the housing through the input vent, and ionized clean air (with ozone) exits through openings on the downstream side of the housing. When the moisture-containing member is wet, the exiting air flow can have increased humidity.

The dust and other particulate matter attaches electrostatically to the second array (or collector) electrodes, and the output air is substantially clean of such particulate matter. Further, ozone generated by the present invention can kill certain types of germs and the like, and also eliminates odors in the output air. Preferably the transporter operates in periodic bursts, and a control permits the user to temporarily increase the high voltage pulse generator output, e.g., to more rapidly eliminate odors in the environment.

In one embodiment, the system includes an internal battery power supply and can be suspended by a cord from a user's neck, with the outflow airstream directly generally upward toward the user. This embodiment is especially useful in a confined area where the air might be stale or germ-laden, for example the seating compartment of an airline, or a bus. A similar embodiment can be used within and powered from the power supply of a motor vehicle, for example, from the cigarette lighter accessory plug of an automobile or truck. This embodiment includes an electronic timer that causes the system to operate for a predetermined time (perhaps half an hour) each time the power supply is turned-on, with an option for the user to cause the system to operate more than once per system turn-on. Alternatively a motion sensor switch comprising a sound or force detecting transducer and movable objects can turn-on the system whenever the vehicle in moving sufficiently to agitate the movable objects such that their vibration-motion is transducer detected.

Other features and advantages of the invention will appear from the following description in which the preferred embodiments have been set forth in detail, in conjunction with the accompanying drawings.

BRIEF DESCRIPTION OF THE DRAWINGS

FIG. 3A is an electrical block diagram of the present invention;

FIG. 3B is a vibration-sensing module to activate the system of FIG. 3A, according to the present invention;

FIG. 4J is a detailed cross-sectional view of a portion of the electrode assembly embodiment of FIG. 4I;

FIG. 4K is a detailed cross-sectional view of a portion of an alternative electrode assembly to the embodiment of FIG. 4I;

FIG. 4L is a detailed cross-sectional view of a portion of a further alternative electrode assembly to the embodiment of FIG. 4I;

FIG. 4M is a cross-section of a portion of the second array electrode shown in the embodiment of FIG. 2D.

DETAILED DESCRIPTION OF THE PREFERRED EMBODIMENT

Figure 1A:
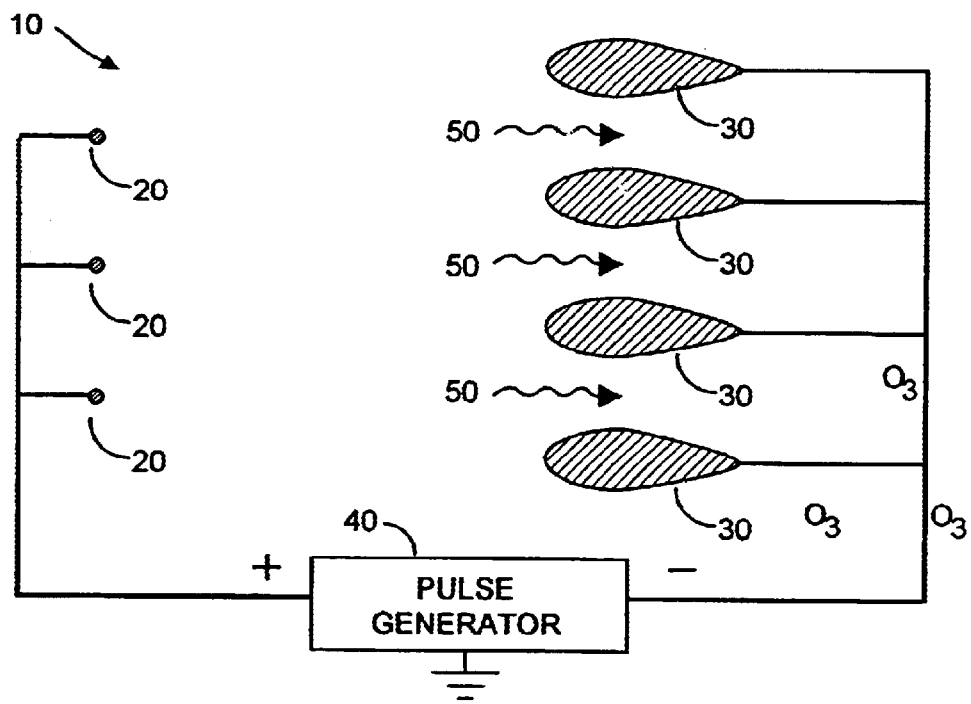
FIG. 1A is a plan, cross-sectional view, of a first embodiment of a prior art electro-kinetic air transporter-conditioner system, according to the prior art.
Figure 1B:
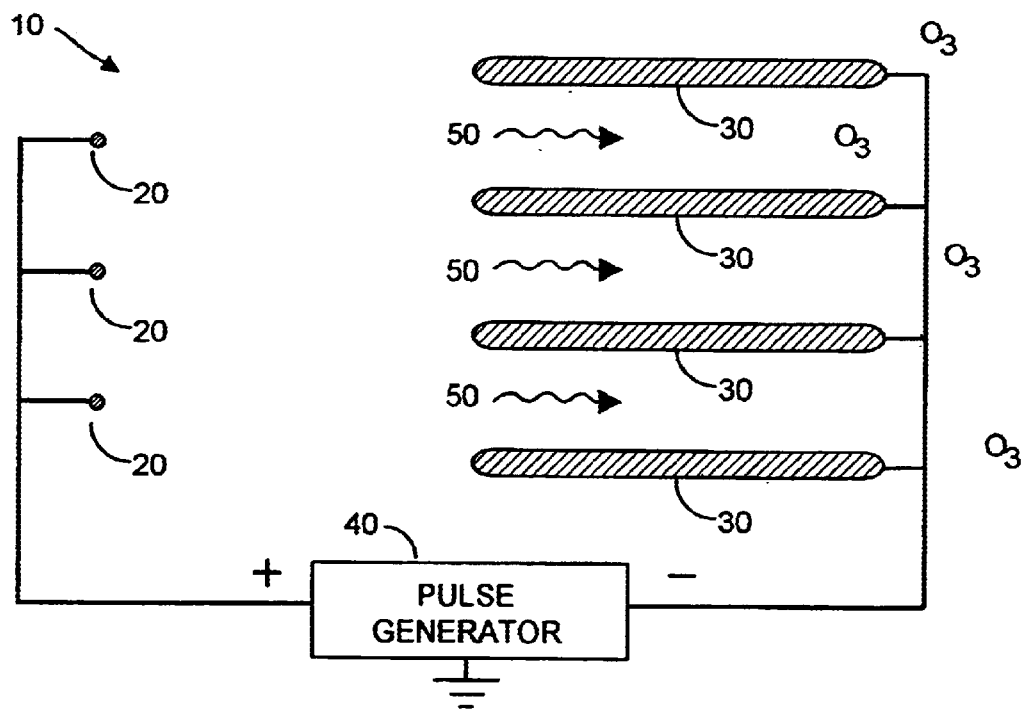
FIG. 1B is a plan, cross-sectional view, of a second embodiment of a prior art electro-kinetic air transporter-conditioner system, according to the prior art.
Figure 2A:
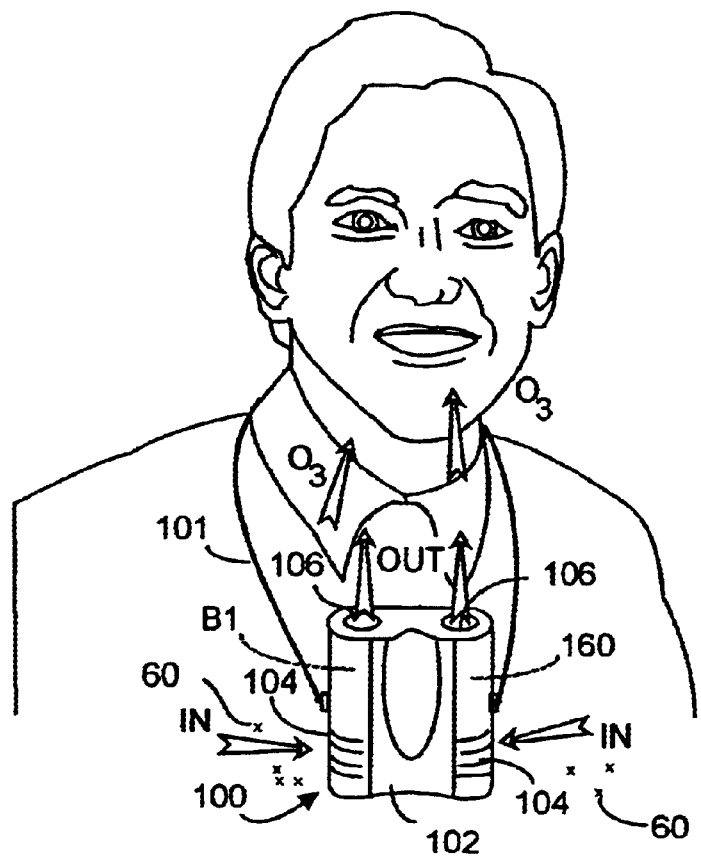
FIG. 2A depicts a preferred embodiment of the present invention worn on the person of a user.

FIG. 2A depicts a preferred embodiment of an electro-kinetic air transporter-conditioner system 100 suspected by a flexible cord 101 from the neck of a user. System 100 is formed within a housing 102 that preferably is a lightweight easily formed material, ABS plastic for example. Housing 102 includes ambient air intake vents 104 and at least one and preferably two output or exhaust vents 106. Ambient air enters vents 104 and exits vents 106, preferably with a higher moisture content, with at least some particulate matter in the ambient air removed (e.g., dust), and with safe amounts of ozone ($O_3$). Housing 102 contains an ion generating unit 160, powered from a battery source B1, also disposed within the housing. Ion generating unit 160 is self-contained in that other than ambient air, nothing is required from beyond the transporter housing for operation of the present invention.

Figure 2B:
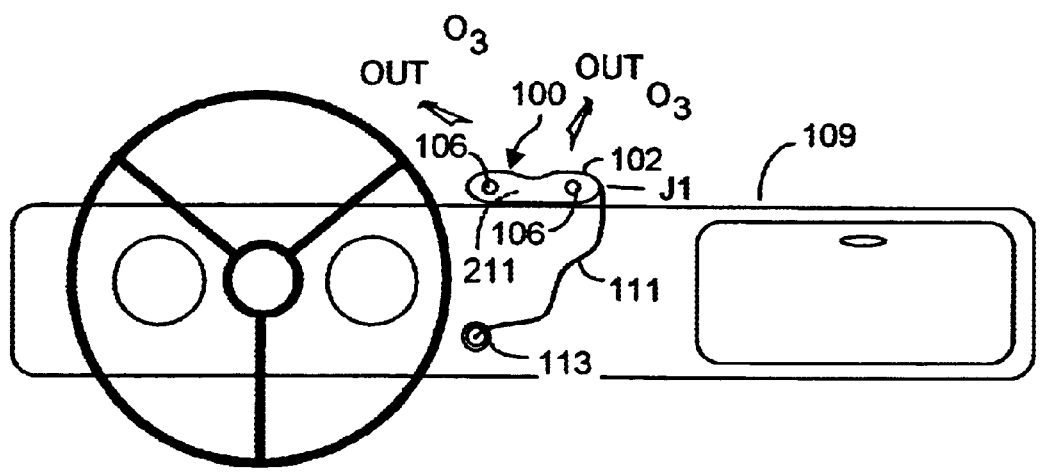
FIG. 2B depicts a preferred embodiment of the present invention used in a motor vehicle.

FIG. 2B depicts a system 100 mounted on or to the interior of a motor vehicle, for example, mounted with Velcro™ material (a closure including a piece of fabric of small hooks that sticks to a corresponding fabric of small loops) to the dashboard 109 of an automobile. In this embodiment, since the vehicle power supply is available, operating power to ion generating unit 160 preferably is obtained via an electrical cable 111 connected between a power inletjack J1 on housing 102 and the motor vehicle cigarette light auxiliary power source 113. System 100 in FIG. 2B may otherwise be identical to system 100 in FIG. 2A except that an optional mechanical motion detector 211 is included. Motion detector 211 is shown in detail in FIG. 3B and advantageously can be used to power-on system 100 whenever the vehicle containing dashboard 109 is moving.

Figure 2C:
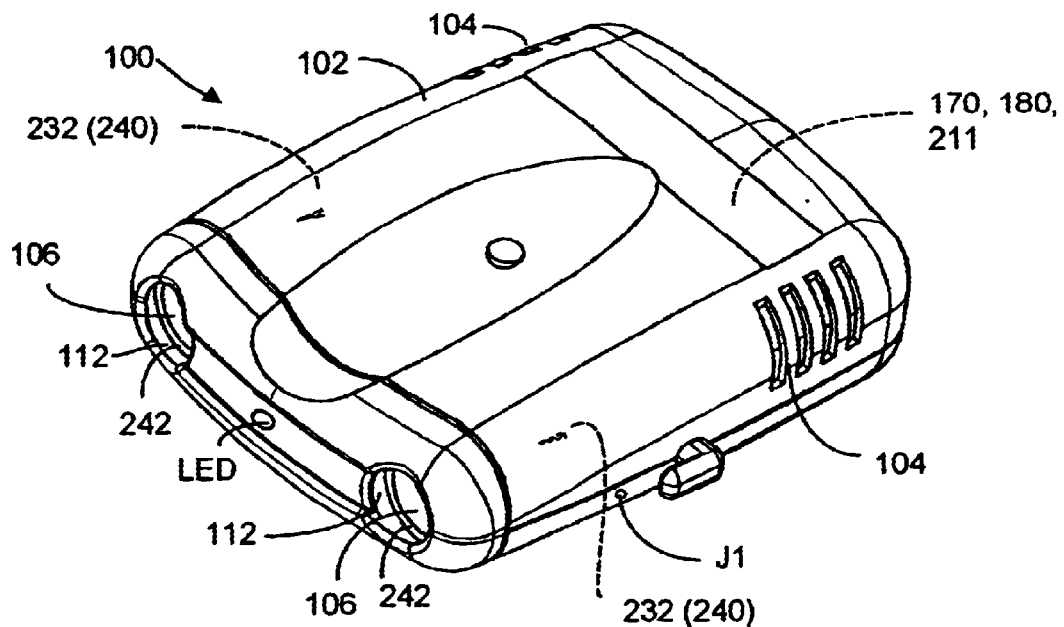
FIG. 2C is a perspective view of the present invention.
Figure 2D:
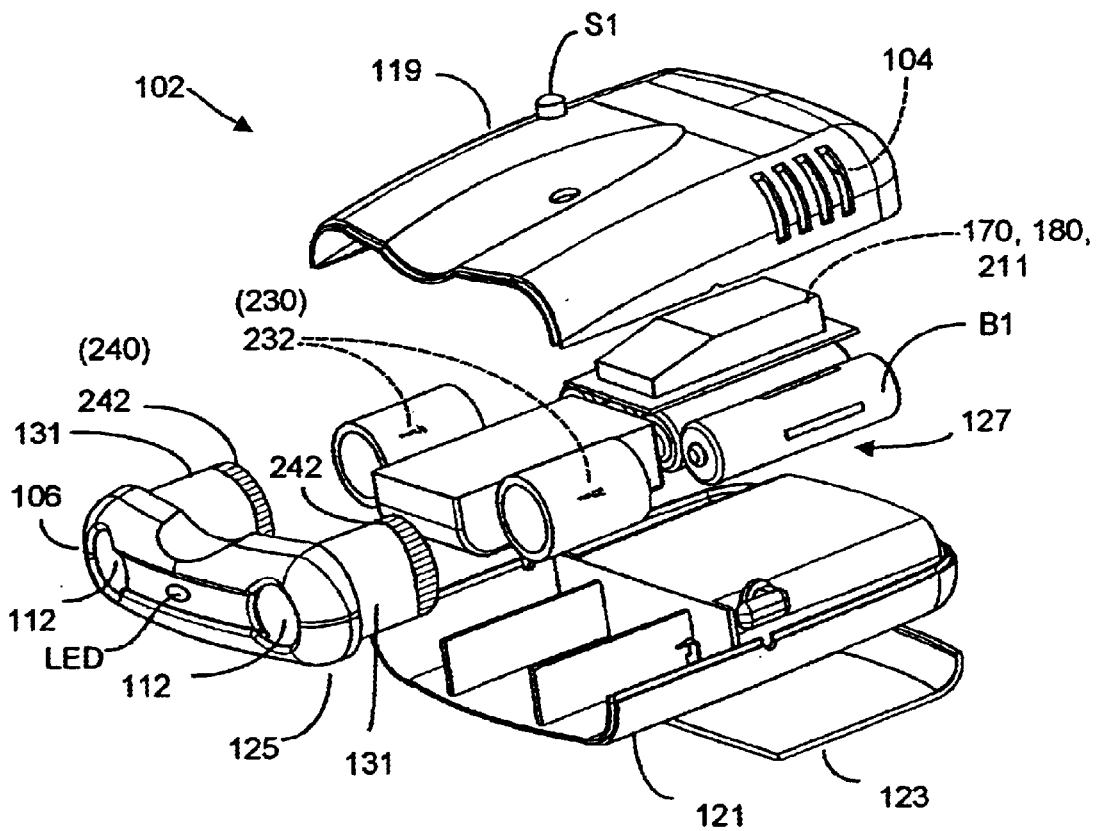
FIG. 2D is a breakaway perspective view of the present invention.

FIG. 2C is a perspective view of system 100 and housing 102. Internal to housing 100, ion generating unit 160 includes a first array 230 of at least one electrode 232 and a second array 240 of at least one electrode 242. The second array electrodes are disposed closer to outlet port 106 in the downstream direction from the first array electrodes, e.g., the air stream created by the present invention will flow generally from the first array electrodes toward the second array electrodes and then out of housing 100 via ports 106. The first and second arrays of electrodes are coupled in series between the output terminals of ion generating unit 160, shown and described with respect to FIG. 3A. In the embodiment of FIG. 2C and 2D, the first array electrodes 232 are pointed elements, whereas the second array electrodes 242 are somewhat disk-like annular elements with a central opening, in which the first array electrode facing surface of the disk transitions smoothly and continuously into a collar that helps define the through opening in the disk. As will be described later herein with respect to FIGS. 4K and 4L, the profile of the collar may be parallel or somewhat cone-shaped, e.g., tending to converge toward the outlet opening.

Optionally, the present invention advantageously can augment moisture content in the output air flow and includes a moisture-retaining member 112 adjacent at least one outlet port 106, preferably disposed as to present the least resistance to the outflow of air. In the preferred embodiment, moisture-retaining member 112 is a hollow collar-like cylinder, perhaps 0.125" thick of ultra-high molecular weight polyethelene (UHMW) material, marketed under the trademark Porex™ (e.g., Porex™ UHMW X-4901), that the user will moisten with water. Such material has a polyethylene base and exhibits a wicking action, and can absorb and retain substantial amounts of moisture such as water.

In the embodiment of FIG. 2B, it may be desired to replace the moisture-retaining material with a scent-imparting material, that can freshen the air within the motor vehicle. If desired, an air humidifying and air scenting function can be employed by combining the Porex™ type material with a scene-imparting material.

FIG. 2D is a breakaway view of the present invention. Housing 102 may (but need not be) formed with an upper member 119 that includes the intake vents 104, a bottom member 121 that includes a battery hatch 123, and a detachable front member 125 that includes output ports 106 and moisture-retaining and/or scent-imparting material 112. The overall dimensions of housing 102 are not critical. In the preferred example, the overall thickness, top to bottom is perhaps 1" (2.5 cm), the width is about 3.5" (8.8 cm) and the length is perhaps 5" (12 cm).

As will be described, when unit 100 is energized, e.g., by closing switch S1 (or the equivalent, e.g., module 211), high voltage output by ion generator 160 produces ions at the first electrode array, which ions are attracted to the second electrode array. The movement of the ions in an "IN" to "OUT" direction carries with them air molecules, thus electro-kinetically producing an outflow of ionized air. The "IN" notion in FIG. 2A denotes the intake of ambient air with particulate matter 60. The "OUT" notation in the figures denotes the outflow of cleaned air substantially devoid of the particulate matter, which adheres electrostatically to the surface of the second array electrodes. In the process of generating the ionized air flow, safe amounts of ozone ($O_3$) are beneficially produced. It may be desired to provide the inner surface of housing 102 with an electrostatic shield to reduces detectable electromagnetic radiation. For example, a metal shield could be disposed within the housing, or portions of the interior of the housing could be coated with a metallic paint to reduce such radiation.

As best seen in FIG. 3A, ion generating unit 160 includes a high voltage generator unit 170 for converting low input voltage, e.g., perhaps 6 VDC from a battery supply B1 or perhaps 12 VDC from a vehicle battery into kilovolt level pulses. High voltage generator unit 170 preferably comprises a low voltage oscillator circuit 190 of perhaps 20 KHz frequency, that outputs low voltage pulses to an electronic switch 200, e.g., a thyristor or the like. Switch 200 switchably couples the low voltage pulses to the input winding of a step-up transformer T1. The secondary winding of T1 is coupled to a high voltage multiplier circuit 210 that outputs high voltage pulses. Preferably the circuitry and components comprising high voltage pulse generator 170 and circuit 180 are fabricated on a printed circuit board that is mounted within housing 102.

Output pulses from high voltage generator 170 preferably are at least 170 KV peak-to-peak with an effective DC offset of perhaps half the peak-to-peak voltage, and have a frequency of perhaps 20 KHZ. The pulse train output preferably has a duty cycle of perhaps 10%, which will promote battery lifetime for the embodiment of FIG. 2A. Of course, different peak-peak amplitudes, DC offsets, pulse train waveshapes, duty cycle, and/or repetition frequencies may instead be used. Indeed, a 100% pulse train (e.g., an essentially DC high voltage) may be used, albeit with shorter battery lifetime. Thus, generator unit 170 may (but need not) be referred to as a DC:DC high voltage pulse generator. Frequency of oscillation is not especially critical but frequency of at least about 20 KHz is preferred as being inaudible to humans.

As shown in FIG. 3A, the output from high voltage pulse generator unit 170 is coupled to an electrode assembly 220 that comprises a first electrode array 230 (that includes at least one first electrode 232) and a second electrode array 240 (that includes at least one second electrode 242). As further shown by FIG. 3A, ion generating unit 160 also includes circuitry 180 that can also include a timer circuit and a visual indicator such as a light emitting diode (LED) that can advise a user when ion generation is occurring. (Of course an audible signal could also or instead be used.) The timer can be set to function for a predetermined time when power is first applied (e.g., with switch S1), for example 30 minutes, and then turn-off system 100. The user could of course again press S1 to obtain another 30 minute outflow of ionized, cleaned air with increased humidity and/or scent. If desired, circuitry 190 and/or 200 could be caused to output a temporary burst of increased ionized air in response to user pressing of a control on housing 102.

For the vehicle embodiment of FIG. 2B, a vibration sensor 211 as shown in FIG. 3B may be attached within housing 102 to turn-on system 100 whenever the vehicle in which system 100 is used is moving. Vibration sensor 211 comprises a sound or force detecting transducer 213 mounted to a small container 215 within which are metal BB's 217 or the like. Sensor 213 may be a Keyocera transducer having perhaps 20 mm diameter, and housing 215 may have a top-to-bottom depth of perhaps 10 mm. As housing 102 is vibrated by the moving vehicle, BB's 217 rattle around within container 215 and the resultant noise or physical impact with the transducer is detected by transducer 217. Wires 219 couple the transducer output to the circuitry shown in FIG. 3A. The result is that when system 100 is plugged into the vehicle cigarette lighter, even if switch S1 is open, when the vehicle moves with sufficient vibration, the rattling BB noise causes transducer 213 to turn-on the electronics shown in FIG. 3A. Preferably the electronics are thus turned-on for a predetermined time, e.g., 30 minutes. After 30 minutes the electronics can turn-off but when the vehicle against produces a sufficiently large vibration, system 100 will be turned-on for an additional 30 minutes.

In some modern vehicles, mechanical vibration is so small that it is desired to have system 100 activated automatically whenever ignition switch is turned-on. Thus, whenever the vehicle is started, system 100 will operate for a pre-determined time (e.g., perhaps 30 minutes or so, determined by circuit 180) and then turn-off. The user can press S1 (or an equivalent switch) to recycle system 100 to function for an additional 30 minutes, etc.

In the embodiment of FIG. 3A, the positive output terminal of unit 170 is coupled to first electrode array 230, and the negative output terminal is coupled to second electrode array 240. This coupling polarity has been found to work well, including minimizing unwanted audible electrode vibration or hum. An electrostatic flow of air is created, going from the first electrode array towards the second electrode array. (This flow is denoted "OUT" in the figures.) Accordingly electrode assembly 220 is mounted within transporter system 100 such that second electrode array 240 is closer to the OUT vents and first electrode array 230 is closer to the IN vents.

When voltage or pulses from high voltage pulse generator 170 are coupled across first and second electrode arrays 230 and 240, it is believed that a plasma-like field is created surrounding electrodes 232 in first array 230. This electric field ionizes the ambient air between the first and second electrode arrays and establishes an "OUT" airflow that moves towards the second array. It is understood that the IN flow enters via vent(s) 104, and that the OUT flow exits via vent(s) 106.

It is believed that ozone and ions are generated simultaneously by the first array electrode(s) 232, essentially as a function of the potential from generator 170 coupled to the first array. Ozone generation may be increased or decreased by increasing or decreasing the potential at the first array. Coupling an opposite polarity potential to the second array electrode(s) 242 essentially accelerates the motion of ions generated at the first array, producing the air flow denoted as "OUT" in the figures. As the ions move toward the second array, it is believed that they push or move air molecules toward the second array. The relative velocity of this motion may be increased by decreasing the potential at the second array relative to the potential at the first array.

For example, if +10 KV were applied to the first array electrode(s), and no potential were applied to the second array electrode(s), a cloud of ions (whose net charge is positive) would form adjacent the first electrode array. Further, the relatively high 10 KV potential would generate substantial ozone. By coupling a relatively negative potential to the second array electrode(s), the velocity of the air mass moved by the net emitted ions increases, as momentum of the moving ions is conserved.

On the other hand, if it were desired to maintain the same effective outflow (OUT) velocity but to generate less ozone, the exemplary 10 KV potential could be divided between the electrode arrays. For example, generator 170 could provide +4 KV (or some other fraction) to the first array electrode(s) and −6 KV (or some other fraction) to the second array electrode(s). In this example, it is understood that the +4 KV and the −6 KV are measured relative to ground. Understandably it is desired that the present invention operate to output safe amounts of ozone. Accordingly, the high voltage is preferably fractionalized with about +4 KV applied to the first array electrode(s) and about −6 KV applied to the second array electrodes.

As noted, outflow (OUT) preferably includes safe amounts of $O_3$ that can destroy or at least substantially alter bacteria, germs, and other living (or quasi-living) matter subjected to the outflow. Thus, when switch S1 is closed and B1 has sufficient operating potential, pulses from high voltage pulse generator unit 170 create an outflow (OUT) of ionized air and $O_3$. When S1 is closed, LED will visually signal when ionization is occurring.

Preferably operating parameters of the present invention are set during manufacture and are not user-adjustable. For example, increasing the peak-to-peak output voltage and/or duty cycle in the high voltage pulses generated by unit 170 can increase air flowrate, ion content, and ozone content. In the preferred embodiment, output flowrate is about 200 feet/minute, ion content is about 2,000,000/cc and ozone content is about 40 ppb (over ambient) to perhaps 2,000 ppb (over ambient). As described herein, decreasing the second electrode/first electrode radius of curvature R2/R1 ratio below about 20:1 will decrease flow rate, as will decreasing the peak-to-peak voltage and/or duty cycle of the high voltage pulses coupled between the first and second electrode arrays.

In practice, unit 100 is energized from B1 or a vehicle battery, whereupon an output flow of clean ionized air is emitted from vents 106. If member 112 is wet with water, the outflow of air will exhibit increased humidity. If member 112 is instead (or in addition) a material that imparts a scent, e.g., perhaps pine or mint odor, the outflow air will also smell fresh. The air flow, coupled with the ions and ozone freshens the air that the user adjacent the unit will breathe, and can be especially beneficial in a closed area such as an airline or motor vehicle passenger compartment. The ozone can beneficially destroy or at least diminish the undesired effects of certain odors, bacteria, germs, and the like. Further, the air flow is indeed electro-kinetically produced, in that there are no intentionally moving parts within the present invention. (As noted, some mechanical vibration may occur within some electrode configurations.) Preferably the present invention is used to output a net surplus of negative ions, as these ions are deemed more beneficial to health than are positive ions.

Having described various aspects of the invention in general, various embodiments of electrode assembly 220 will now be described. In the various embodiments, electrode assembly 220 will comprise a first array 230 of at least one electrode 232, and will further comprise a second array 240 of preferably at least one electrode 242. Understandably material(s) for electrodes 232 and 242 should conduct electricity, be resilient to corrosive effects from the application of high voltage, yet be strong enough to be cleaned.

Figure 4A:
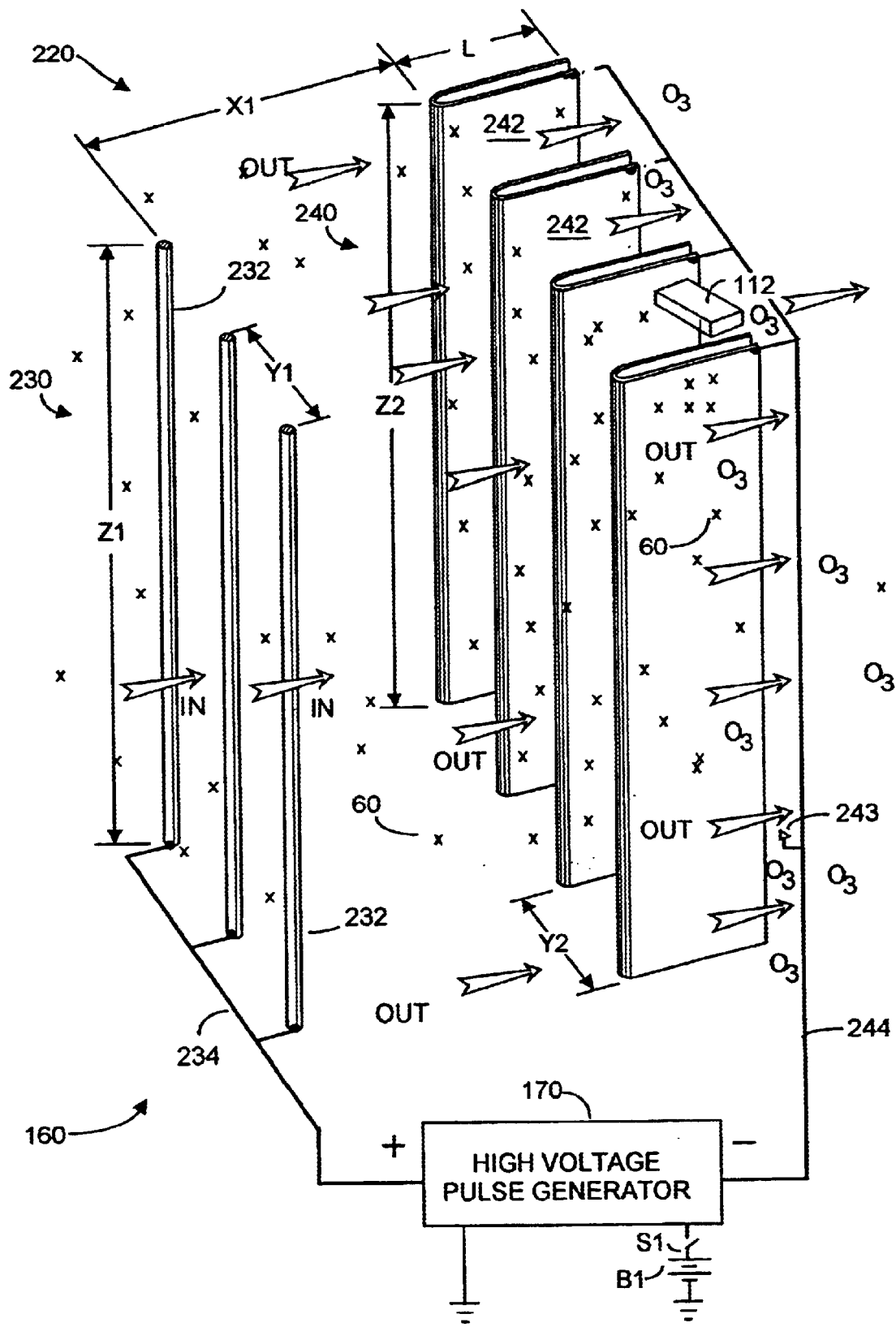
FIG. 4A is a perspective block diagram showing a first embodiment for an electrode assembly, according to the present invention.

FIG. 4A depicts an electrode array 220 that is especially good for removing particulate matter (shown as 60) from incoming ambient air in that the downstream electrodes 242 in second array 240 have relatively large collection surfaces 244 whereon particulate matter 60 can be electrostatically attracted and accumulated, until cleaned by the user. In this embodiment, electrode(s) 232 in the first electrode array 230 are wire or wire-like and are preferably fabricated from tungsten. Tungsten is sufficiently robust to withstand occasional cleaning, has a high melting point to retard breakdown due to ionization, and has a rough exterior surface that seems to promote efficient ionization. On the other hand, electrodes 242 preferably will have a highly polished exterior surface to minimize unwanted point-to-point radiation. As such, electrodes 242 preferably are fabricated from stainless steel, brass, among other materials. The polished surface of electrodes 232 also promotes ease of electrode cleaning.

In contrast to the prior art electrodes disclosed by Lee, electrodes 232 and 242 according to the present invention are light weight, easy to fabricate, and lend themselves to mass production. Further, electrodes 232 and 242 described herein promote more efficient generation of ionized air, and production of safe amounts of ozone, $O_3$. Shown generally in FIG. 4A is moisture and/or scene imparting member 112, disposed in the downstream region of the invention. If member 112 is made wet with water, air passing by member 112 en route to outlet port 106 will increase in humidity. By the same token, if member 112 contains a pleasant scent, air passing by en route to outlet port 106 will exit the present invention with a more pleasant aroma.

Figure 4B:
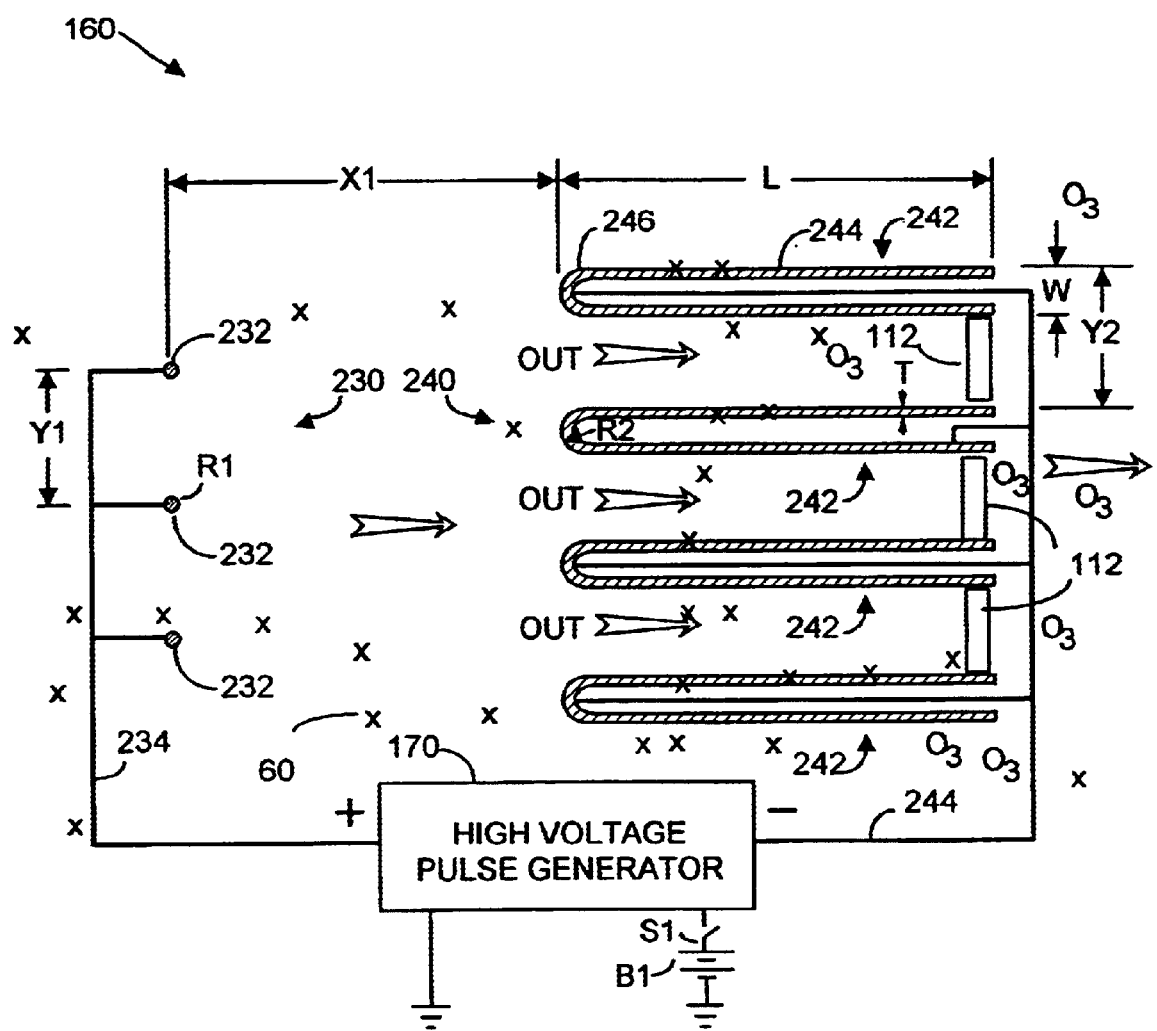
FIG. 4B is a plan block diagram of the embodiment of FIG. 4A.

As shown in FIGS. 4A and 4B, high voltage pulse generator 170 is coupled between the first electrode array 230 and the second electrode array 240. As noted, high voltage pulses from generator 170 produce a flow of ionized air that travels in the direction from the first array towards the second array (indicated herein by hollow arrows denoted "OUT"). As such, electrode(s) 232 may be referred to as an emitting electrode, and electrodes 242 may be referred to as collector electrodes or accelerator electrodes. This outflow advantageously contains safe amounts of $O_3$, and exits the present invention from vent(s) 106.

According to the present invention, it is preferred that the positive output terminal or port of the high voltage pulse generator be coupled to electrodes 232, and that the negative output terminal or port be coupled to electrodes 242. It is believed that the net polarity of the emitted ions is positive, e.g., more positive ions than negative ions are emitted. In any event, the preferred electrode assembly electrical coupling minimizes audible hum from electrodes 232 contrasted with reverse polarity (e.g., interchanging the positive and negative output port connections).

However, while generation of positive ions is conducive to a relatively silent air flow, from a health standpoint, it is desired that the output air flow be richer in negative ions, not positive ions. It is noted that in some embodiments, however, one port (preferably the negative port) of the high voltage pulse generator may in fact be the ambient air. Thus, electrodes in the second array need not be connected to the high voltage pulse generator using wire. Nonetheless, there will be an "effective connection" between the second array electrodes and one output port of the high voltage pulse generator, in this instance, via ambient air.

In the embodiments of FIGS. 4A and 4B, electrode assembly 220 comprises a first array 230 of wire electrodes 232, whereas second array 240 includes generally "U"-shaped preferably hollow electrodes 242. In preferred embodiments, the number N1 of electrodes comprising the first array will preferably differ by one relative to the number N2 of electrodes comprising the second array. In many of the embodiments shown, N2>N1. However, if desired, in FIG. 4A, addition first electrodes 232 could be added at the out ends of array 230 such that N1>N2, e.g., five electrodes 232 compared to four electrodes 242.

Electrodes 242 are formed from sheet metal, preferably stainless steel, although brass or other sheet metal could be used. The sheet metal is readily formed to define side regions 244 and bulbous nose region 246 for hollow elongated "U" shaped electrodes 242. While FIG. 4A depicts four electrodes 242 in second array 240 and three electrodes 232 in first array 230, as noted, other numbers of electrodes in each array could be used, preferably retaining a symmetrically staggered configuration as shown. It is seen in FIG. 4A that while particulate matter 60 is present in the incoming (IN) air, the outflow (OUT) air is substantially devoid of particulate matter, which adheres to the preferably large surface area provided by the second array electrodes (see FIG. 4B).

As best seen in FIG. 4B, the spaced-apart configuration between the arrays is staggered such that each first array electrode 232 is substantially equidistant from two second array electrodes 242. This symmetrical staggering has been found to be an especially efficient electrode placement. Preferably the staggering geometry is symmetrical in that adjacent electrodes 232 or adjacent electrodes 242 are spaced-apart a constant distance, Y1 and Y2 respectively. However, a non-symmetrical configuration could also be used, although ion emission and air flow would likely be diminished. Also, it is understood that the number of electrodes 232 and 242 may differ from what is shown.

Assume that system 100 has overall dimensions of perhaps 6" height (15 cm), 4" width (10 cm) and perhaps 1" thickness (2.5 cm). In FIG. 4A, typically dimensions would be as follows: diameter of electrodes 232 is about 0.08 mm, distances Y1 and Y2 are each about 16 mm, distance X1 is about 16 mm, distance L is about 10 mm, and electrode heights Z1 and Z2 are each about 12 cm. The width W of electrodes 242 is preferably about 4 mm, and the thickness of the material from which electrodes 242 are formed is about 0.5 mm. Of course other dimensions and shapes could be used. It is preferred that electrodes 232 be small in diameter to help establish a desired high voltage field. On the other hand, it is desired that electrodes 232 (as well as electrodes 242) be sufficiently robust to withstand occasional cleaning.

Electrodes 232 in first array 230 are coupled by a conductor 234 to a first (preferably positive) output port of high voltage pulse generator 170, and electrodes 242 in second array 240 are coupled by a conductor 244 to a second (preferably negative) output port of generator 170. It is relatively unimportant where on the various electrodes electrical connection is made to conductors 234 or 244. Thus, by way of example FIG. 4B depicts conductor 244 making connection with some electrodes 242 internal to bulbous end 246, while other electrodes 242 make electrical connection to conductor 244 elsewhere on the electrode. Electrical connection to the various electrodes 242 could also be made on the electrode external surface providing no substantial impairment of the outflow airstream results.

It is preferred that at least electrode assembly 240 is readily removable from housing 102 for cleaning, e.g., removing accumulated particulate matter 60 from the electrode surfaces. Thus, housing 102 may be provided with a user-removable second array 240, or the housing may include a break-away feature providing the user with access to the second array for such periodic cleaning as may be required.

Referring to the geometry of the electrodes shown in FIGS. 4A and 4B, and indeed in other configurations shown herein, the ratio of the effective electric field emanating radius of electrode 232 to the nearest effective radius of electrodes 242 is at least about 15:1, and preferably is at least 20:1. Thus, in the embodiment of FIG. 4A and FIG. 4B, the ratio R2/R1≈2 mm/0.04 mm≈50:1. Other dimensions may be used in other configurations, but preferably a minimum R2/R1 ratio is maintain that is at least about 15:1.

In this and the other embodiments to be described herein, ionization appears to occur at the smaller electrode(s) 232 in the first electrode array 230, with ozone production occurring as a function of high voltage arcing. For example, increasing the peak-to-peak voltage amplitude and/or duty cycle of the pulses from the high voltage pulse generator 170 can increase ozone content in the output flow of ionized air. If desired, user-control S2 can be used to somewhat vary ozone content by varying (in a safe manner) amplitude and/or duty cycle. Specific circuitry for achieving such control is known in the art and need not be described in detail herein.

Note the inclusion in FIGS. 4A and 4B of at least one output controlling electrode 243, preferably electrically coupled to the same potential as the second array electrodes. Electrode 243 preferably defines a pointed shape in side profile, e.g., a triangle. The sharp point on electrode(s) 243 causes generation of substantial negative ions (since the electrode is coupled to relatively negative high potential). These negative ions neutralize excess positive ions otherwise present in the output air flow, such that the OUT flow has a net negative charge. Electrode(s) 243 preferably are stainless steel, copper, or other conductor, and are perhaps 20 mm high and about 12 mm wide at the base although other shapes and/or dimensions could be used.

Another advantage of including pointed electrodes 243 is that they may be stationarily mounted within the housing of unit 100, and thus are not readily reached by human hands when cleaning the unit. Were it otherwise, the sharp point on electrode(s) 243 could easily cause cuts. The inclusion of one electrode 243 has been found sufficient to provide a sufficient number of output negative ions, but more such electrodes may be included.

Figure 4C:
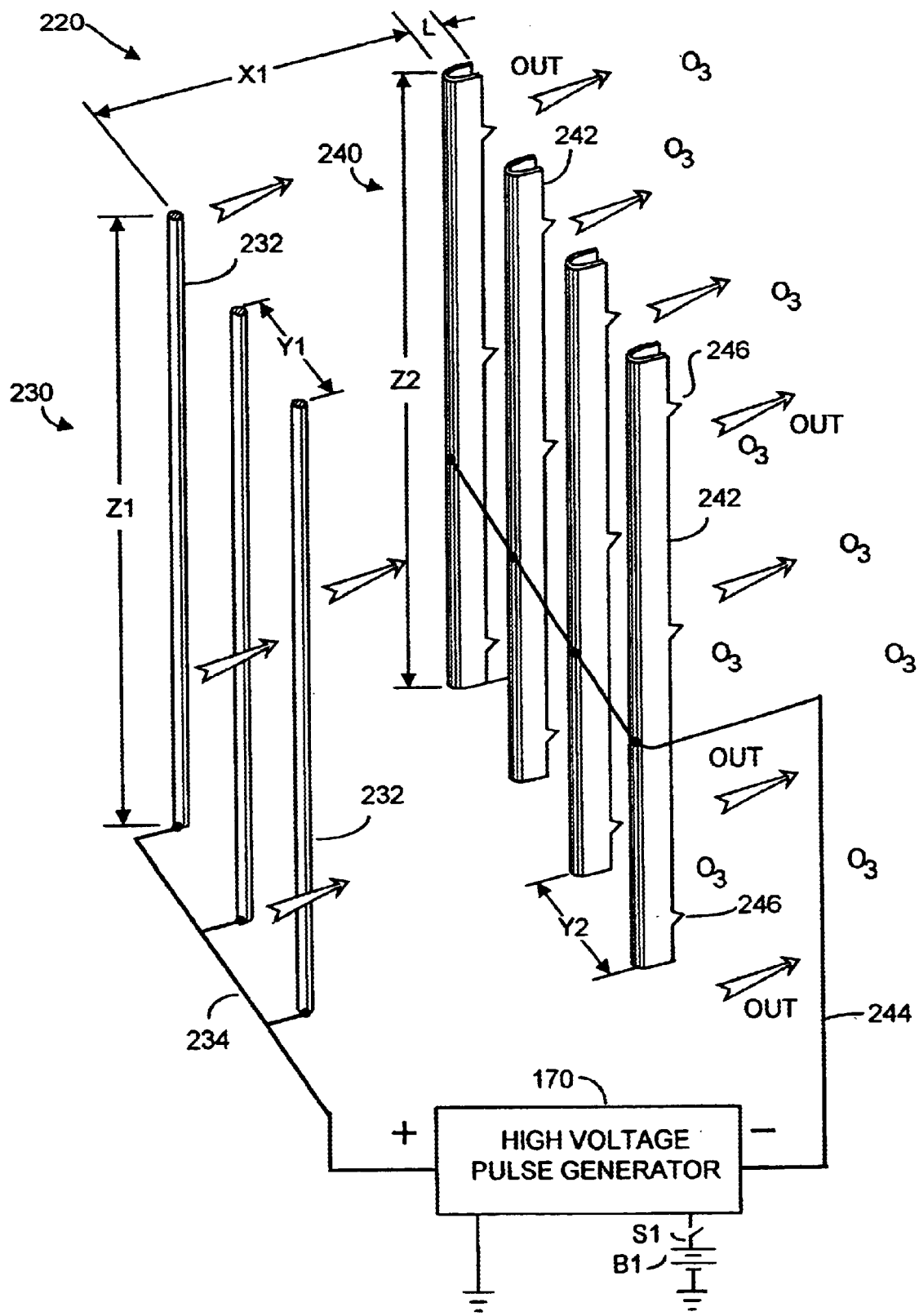
FIG. 4C is a perspective block diagram showing a second embodiment for an electrode assembly, according to the present invention.

The electrode configurations of FIGS. 4C and 4D will now be described. In the embodiment of FIGS. 4A and 4C, each "U"-shaped electrode 242 has two trailing edges that promote efficient kinetic transport of the outflow of ionized air and $O_3$. Note the inclusion on at least one portion of a trailing edge of a pointed electrode region 243'. Electrode region 243' helps promote output of negative ions, in the same fashion as was described with respect to FIGS. 4A and 4B. Note, however, the higher likelihood of a user cutting himself or herself when wiping electrodes 242 with a cloth or the like to remove particulate matter deposited thereon. In FIG. 4C and the figures to follow, the particulate matter is omitted for ease of illustration. However, from what was shown in FIGS. 2A–4B, particulate matter will be present in the incoming air, and will be substantially absent from the outgoing air. As has been described, particulate matter 60 typically will be electrostatically precipitated upon the surface area of electrodes 242.

Figure 4D:
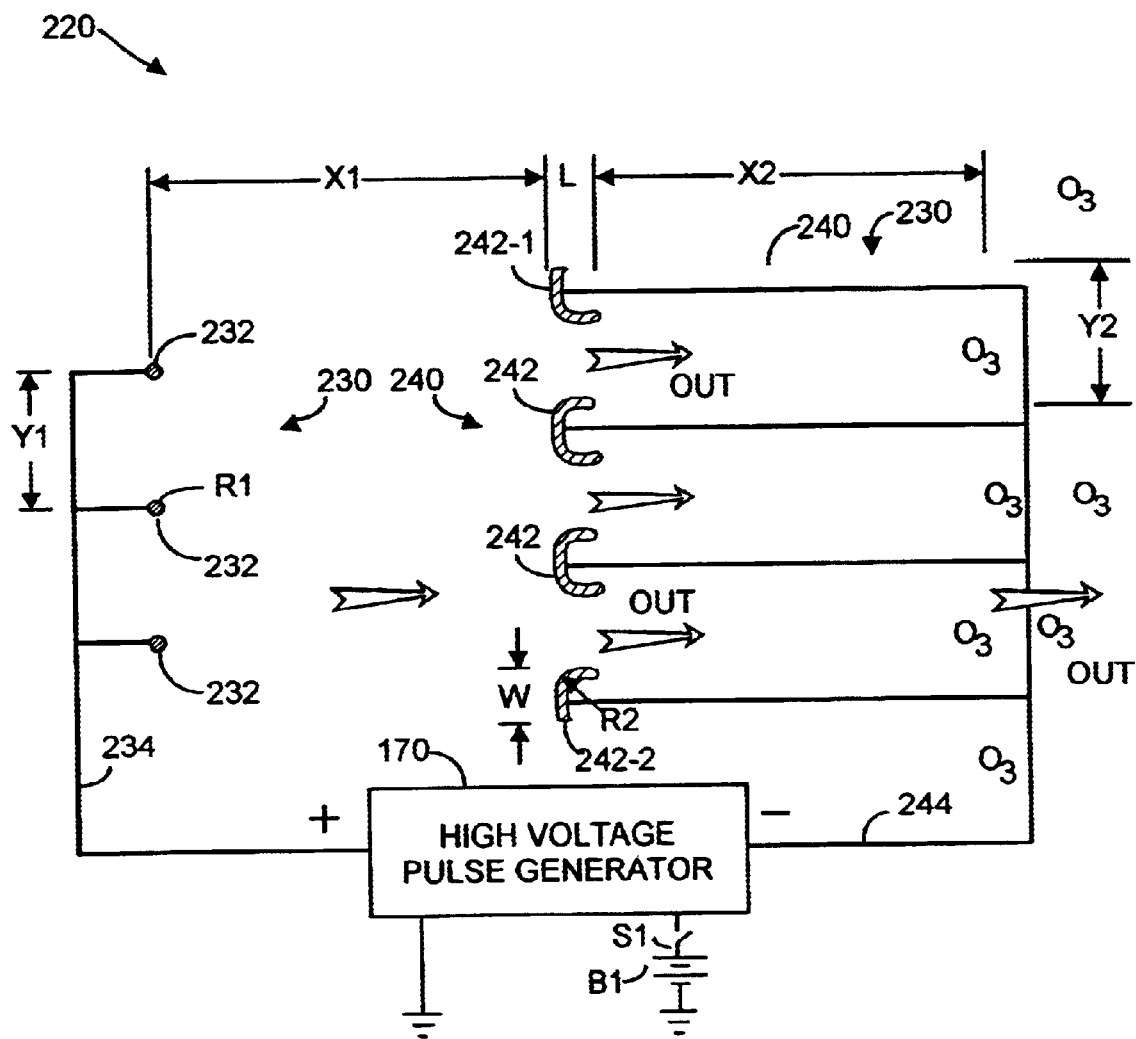
FIG. 4D is a plan block diagram of a modified version of the embodiment of FIG. 4C.

Note that the embodiments of FIGS. 4C and 4D depict somewhat truncated versions of electrodes 242. Whereas dimension L in the embodiment of FIGS. 4A and 4B was about 10 mm, in FIGS. 4C and 4D, L has been shortened to about 5 mm. Other dimensions in FIG. 4C preferably are similar to those stated for FIGS. 4A and 4B. In FIGS. 4C and 4D, the inclusion of point-like regions 246 on the trailing edge of electrodes 242 seems to promote more efficient generation of ionized air flow. It will be appreciated that the configuration of second electrode array 240 in FIG. 4C can be more robust than the configuration of FIGS. 4A and 4B, by virtue of the shorter trailing edge geometry. As noted earlier, a symmetrical staggered geometry for the first and second electrode arrays is preferred for the configuration of FIG. 4C.

In the embodiment of FIG. 4D, the outermost second electrodes, denoted 242-1 and 242-2, have substantially no outermost trailing edges. Dimension L in FIG. 4D is preferably about 3 mm, and other dimensions may be as stated for the configuration of FIGS. 4A and 4B. Again, the R2/R1 ratio for the embodiment of FIG. 4D preferably exceeds about 20:1.

Figure 4E:
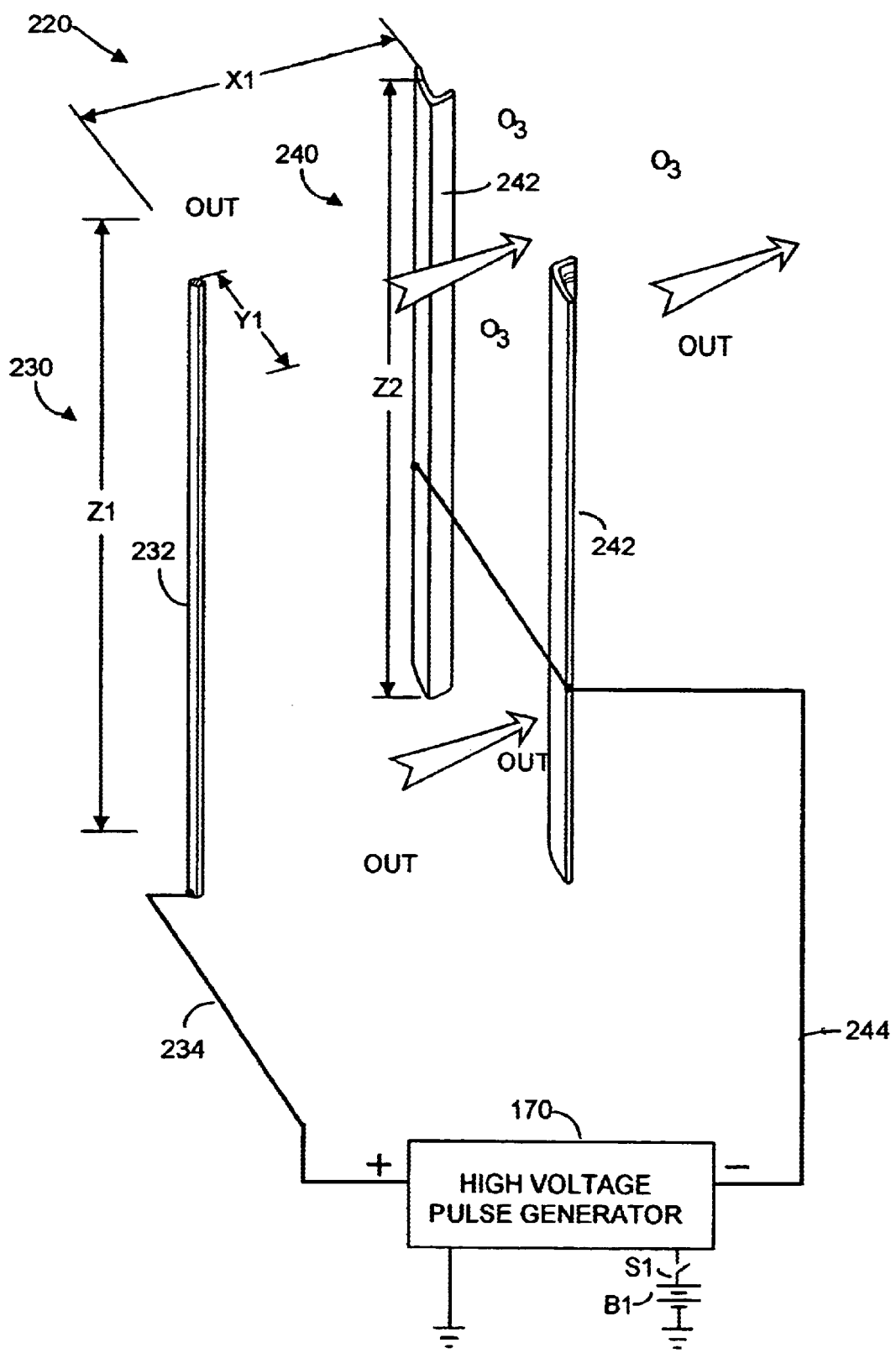
FIG. 4E is a perspective block diagram showing a third embodiment for an electrode assembly, according to the present invention.
Figure 4F:
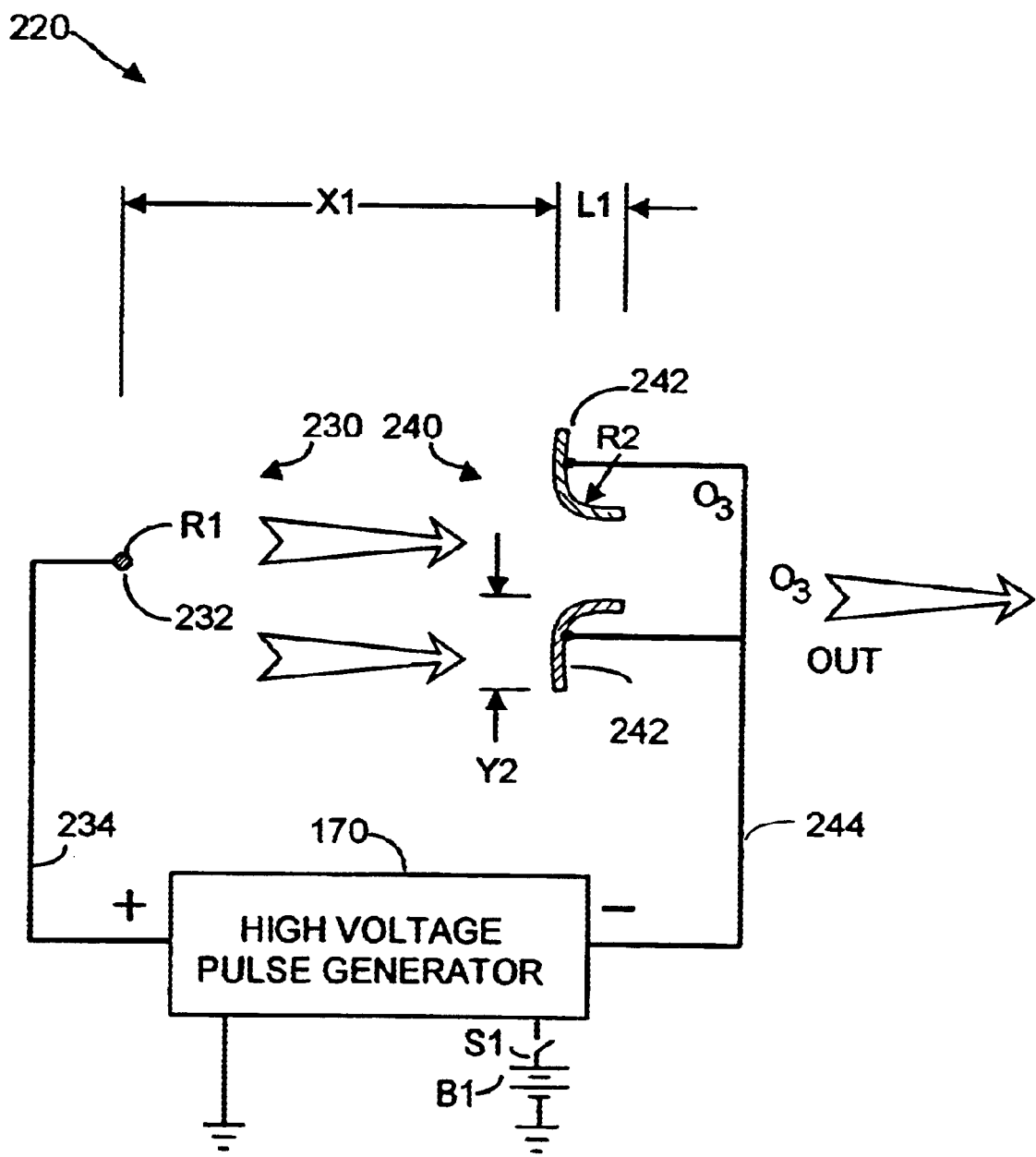
FIG. 4F is a plan block diagram of the embodiment of FIG. 4E.

FIGS. 4E and 4F depict another embodiment of electrode assembly 220, in which the first electrode array comprises a single wire electrode 232, and the second electrode array comprises a single pair of curved "L"-shaped electrodes 242, in cross-section. Typical dimensions, where different than what has been stated for earlier-described embodiments, are X1≈12 mm, Y1≈6 mm, Y2≈5 mm, and L1≈3 mm. The effective R2/R1 ratio is again greater than about 20:1. The fewer electrodes comprising assembly 220 in FIGS. 4E and 4F promote economy of construction, and ease of cleaning, although more than one electrode 232, and more than two electrodes 242 could of course be employed. This embodiment again incorporates the staggered symmetry described earlier, in which electrode 232 is equidistant from two electrodes 242.

Figure 4G:
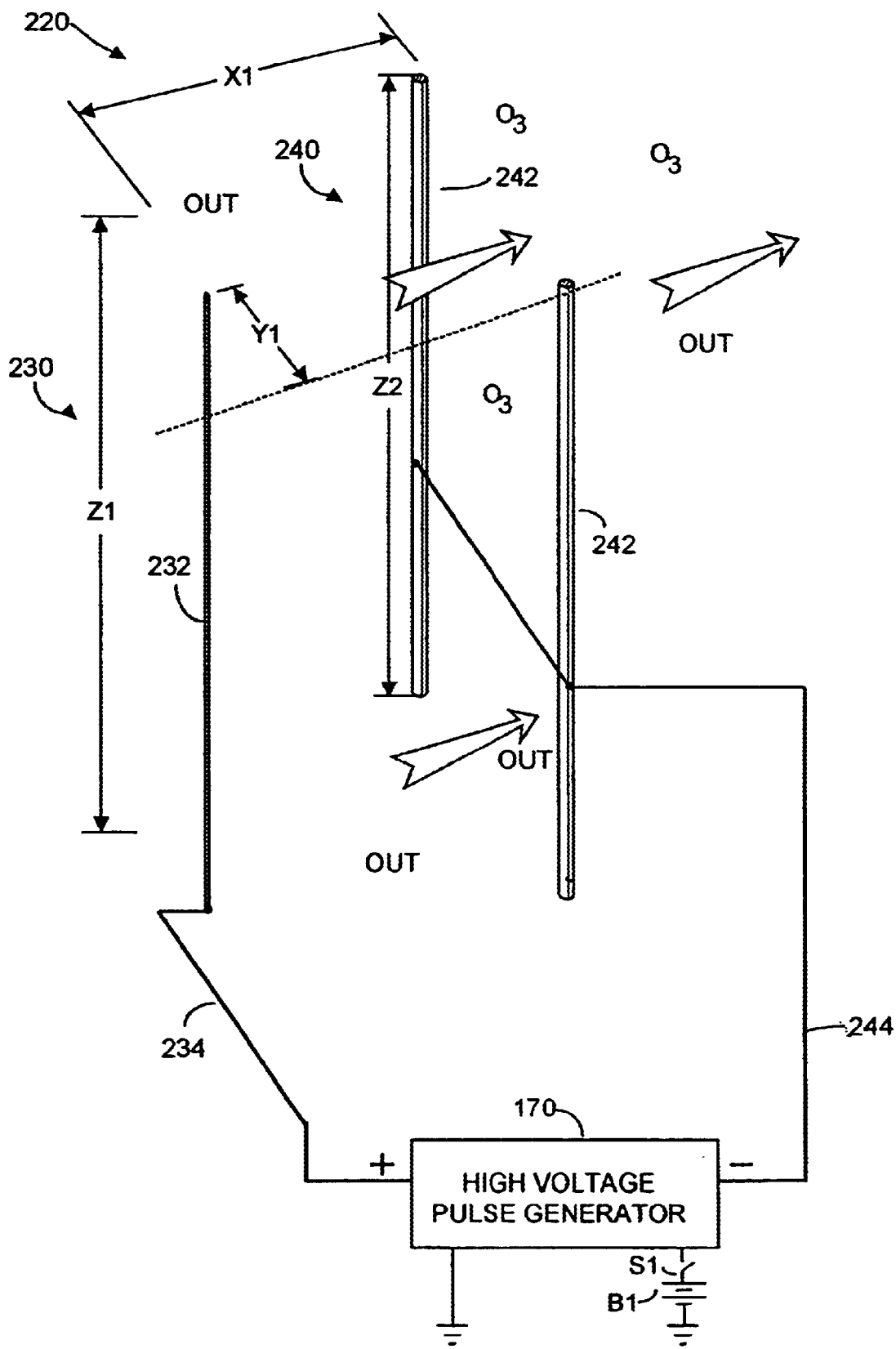
FIG. 4G is a perspective block diagram showing a fourth embodiment for an electrode assembly, according to the present invention.
Figure 4H:
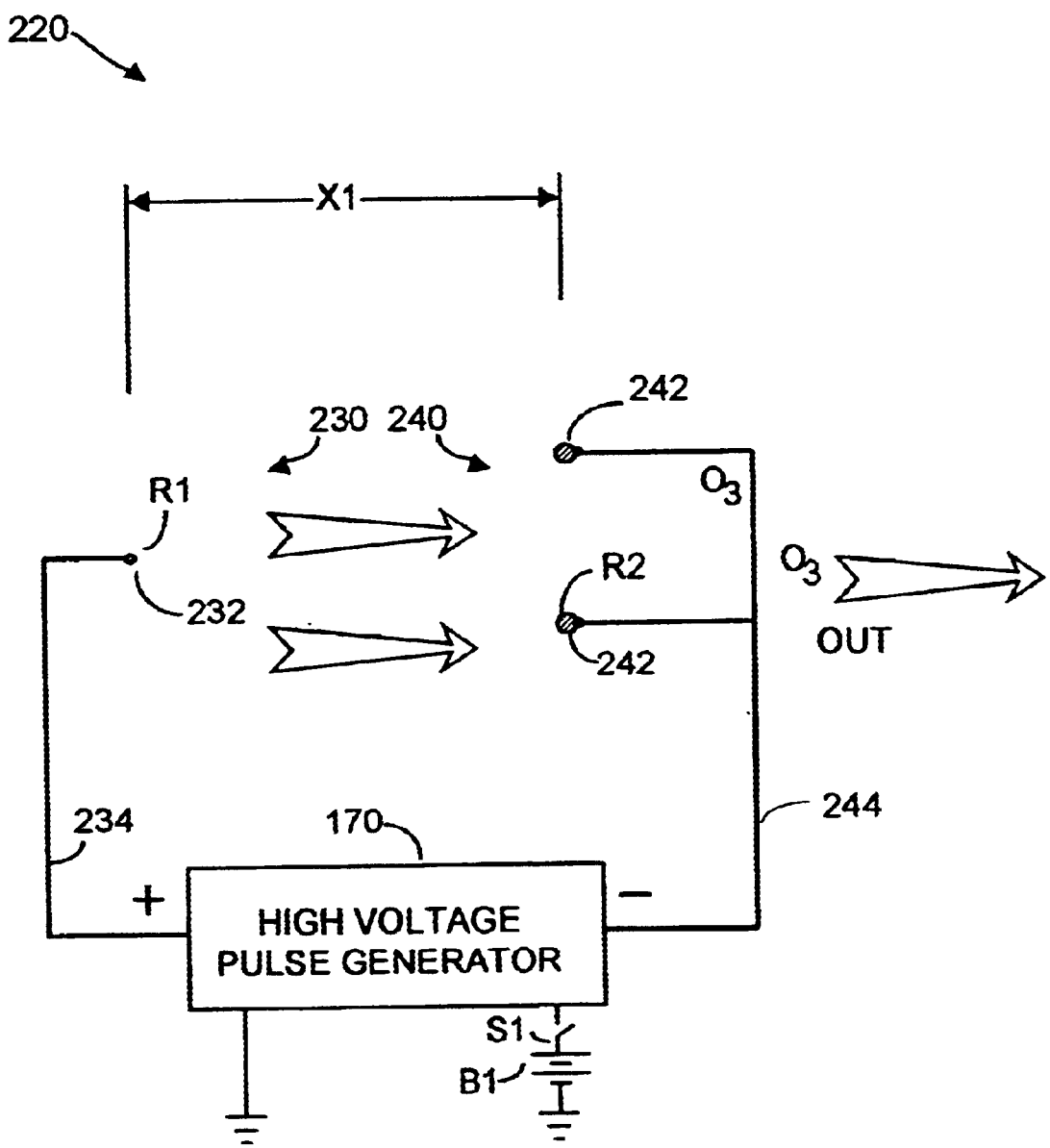
FIG. 4H is a plan block diagram of the embodiment of FIG. 4G.

FIG. 4G and 4H shown yet another embodiment for electrode assembly 220. In this embodiment, first electrode array 230 is a length of wire 232, while the second electrode array 240 comprises a pair of rod-or columnar electrodes 242. As in embodiments described earlier herein, it is preferred that electrode 232 be symmetrically equidistant from electrodes 242. Wire electrode 232 is preferably perhaps 0.08 mm tungsten, whereas columnar electrodes 242 are perhaps 2 mm diameter stainless steel. Thus, in this embodiment the R2/R1 ratio is about 25:1. Other dimensions may be similar to other configurations, e.g., FIGS. 4E, 4F. Of course electrode assembly 220 may comprise more than one electrode 232, and more than two electrodes 242.

Figure 4I:
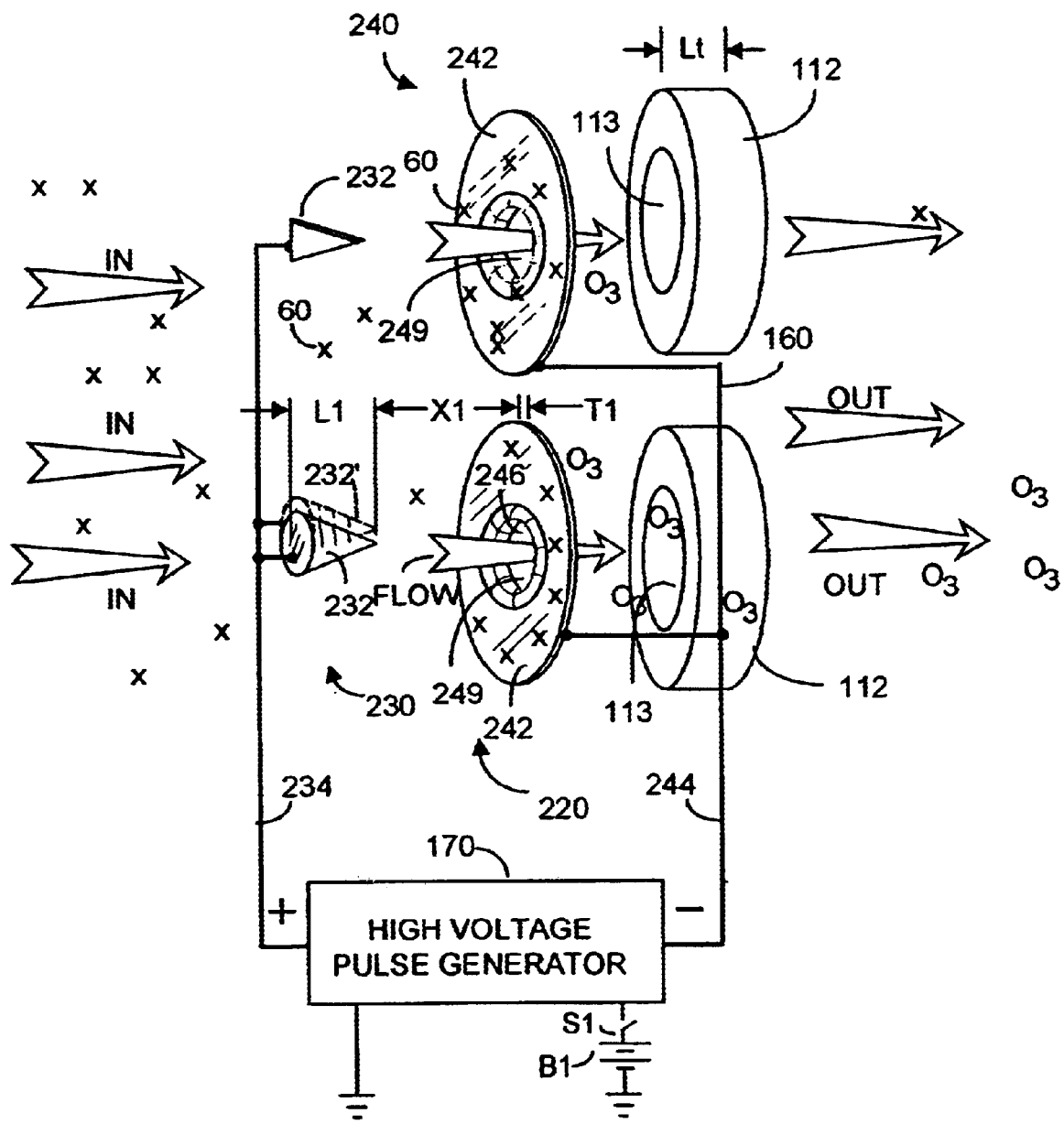
FIG. 4I is a perspective block diagram showing an especially preferred embodiment for an electrode assembly, according to the present invention.

An especially preferred embodiment is shown in FIGS. 4I–4K, and to a lesser extent FIG. 4L as well. Referring now to FIG. 4I, the upstream or first electrode array 230 comprises first and second pin-like or pointed electrodes 232, downstream substantially co-axial from which are disposed first and second annular-like electrodes 242 in the second electrode array 240. Note that the first array electrodes 232 may be pointed, or pin-like, or cone-like and that more than one first array electrode 232, 232' may be provided for a single second array electrode 242. Preferably each second array electrode 242 has a smoothly rounded inner opening 246. The surface of electrode 242 that faces electrode 232 will transition smoothly and continuously into this opening to form a collar region 247, best seen in FIGS. 4J–4N. The material comprising second array electrode 242 surrounds this opening, which preferably is coaxial with and downstream from the pointed end or tapered end of electrode 232.

Note that particulate matter 60 will be electro-kinetically transported towards and will tend to electrostatically adhere to the surface of electrodes 242 facing upstream, e.g., towards pointed electrodes 232. Preferably electrodes 232 are tungsten, and electrodes 242 are stainless steel. In the various electrode embodiments described herein, the upstream electrodes 232 preferably will be tungsten as this material can sustain high temperature associated with ionization. By contrast, the downstream electrodes 242 typically are machined or fabricated and will be made from a material more workable than tungsten, yet durable, stainless steel being a preferred such material.

FIG. 4I also depicts member 112 disposed adjacent a downstream region of the electrode array, preferably downstream from second electrodes 242. By forming member 112 with an annular opening 113. Member 112 has a length Lt of about 1" (2.5 cm) and the annular opening has a diameter of perhaps 0.5" (1.2 cm). In the preferred embodiment, the diameter of the annular opening in member 112 is greater than the diameter D' (about 0.375" or 9.5 mm) of the opening 249 formed in electrodes 242. If Porex™ material or similar moisture-containing material is used and is saturated with water, humidity of the airstream exiting the present invention may be increased by about 10% to about 20% compared to ambient air. In an aircraft cabin environment where ambient air is especially dry (as well as being stale and perhaps germ laden), the ability of a user to generate and breath clean air with ozone and increased humidity can make air travel more enjoyable. As noted, member 112 may also or instead be moistened with medication, e.g., for an asthmatic user, or may include a scent improving chemical to enhance the aroma of the output air.

Referring briefly to FIG. 2D, member 4I is a cylinder of preferably Porex™ material 112 inserted from the rear (with electrode 242 temporarily removed) within plastic cylinder 131 of housing portion 125. Housing member 125 is user-removable from the rest of the housing, whereupon material 112 may be wet with water, medication, scent material, etc. after which housing member 125 is joined to the remainder of the housing.

Typical dimensions for the embodiment of FIGS. 4I–4N are L1≈10 mm, X1≈9.5 mm, T≈0.5 mm, and the diameter of opening 246 is about 12 mm. Dimension L1 preferably is sufficiently long that upstream portions of electrode 232 (e.g., portions to the left in FIG. 4I) do not interfere with the electrical field between electrode, 232 and the collector electrode 242. However, as shown in FIG. 4J, the effective R2/R1 ratio is governed by the tip geometry of electrode 232. Again, in the preferred embodiment, this ratio exceeds about 15:1 and more preferably exceeds about 20:1. Lines drawn in phantom in FIGS. 4J–4N depict theoretical electric force field lines, emanating from emitter electrode 232, and terminating on the curved surface of collector electrode 246. Preferably the bulk of the field emanates within about ±45° of coaxial axis between electrode 232 and electrode 242. On the other hand, if the opening in electrode 242 and/or electrode 232 and 242 geometry is such that too narrow an angle about the coaxial axis exists, air flow will be unduly restricted.

One advantage of the ring-pin electrode assembly configuration shown in FIG. 4I is that the upstream-facing flat surface regions of annular-like electrode 242 provide sufficient surface area to which particulate matter 60 entrained in the moving air stream can attach, yet be readily cleaned. Further, the ring-pin type configuration shown in FIGS. 4I–4N advantageously can generate more ozone than prior art configurations, or the configurations of FIGS. 4A–4H. For example, whereas the configurations of FIGS. 4A–4H may generate perhaps 50 ppb ozone, the configuration of FIG. 4I can generate about 2,000 ppb ozone.

In FIG. 4J, a detailed cross-sectional view of the central portion of electrode 242 in FIG. 4I is shown. As best seen in FIG. 4J, curved region 246 adjacent the central opening 249 in electrode 242 forms a smooth transition between the planar regions of electrode 242 (whereon particulate matter tends to collect), and the collar region 247 through which the clean and ionized air flow passes in going through electrode 242. In FIG. 4K, collar region 247 is elongated relative to the embodiment of FIG. 4J, and the collar region in cross-section may be said to define a cylinder. Compare, for example, collar region 247 in FIG. 4L, which region in cross-section defines a converging cone, e.g., opposite surfaces of the region are not parallel but rather tend to converge, in a narrowed exit opening.

In the various embodiments shown in FIGS. 4I–4N, the relatively smooth and continuous transition between the planar surface of electrode 242 and the interior of the collar region aids the flow of air therethrough. Further, the continuous surface so defined provides an acceptably large surface area to which many ionization paths from the distal tip of electrode 232 have substantially equal path length. Thus, while the distal tip (or emitting tip) of electrode 232 is pointed or sharp and is advantageously small to concentrate the electric field between the electrode arrays, the adjacent regions of electrode 242 preferably provide many equidistant inter-electrode array paths. A high exit flowrate of perhaps 90 feet/minute and 2,000 ppb range ozone emission attainable with the configurations of FIG. 4I–4M confirm a high operating efficiency.

FIG. 4M is a cross-section of a portion of the cylindrical portion 131 of front housing member 125 showing the relationship between the preferably plastic housing portion 131, the moisture-retaining cylinder of material 112 within this housing portion, and a lipped annular electrode 160 that is adhesively attached to the rearmost (e.g., facing pin-like electrode 232) section of housing portion 131. The user need only remove housing portion 125 from the remainder of the housing, run water or other liquid through port opening 106 to thoroughly wet material 112, and then re-insert housing portion 125 into the remainder of housing 102. Housing portion 125 is retained within housing 102 by a spring-loaded mechanism that the user can release with a sliding mechanism on the lower surface of housing 102 (not shown in FIG. 2D for clarity) when necessary. Once well wet with water (or other liquid), member 112 will act to increase humidity of clear air output by the present invention for an hour or two before it is necessary to re-moisten member 112.

Figure 4N:
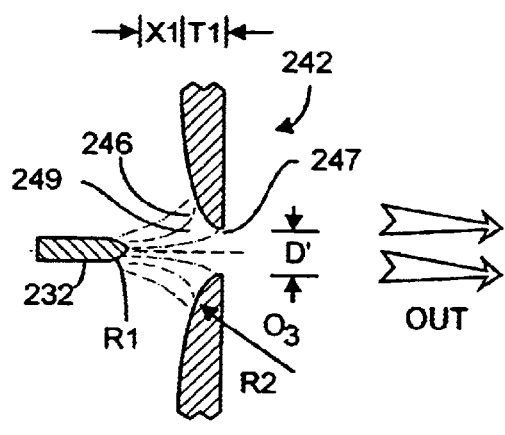
FIG. 4N is a detailed cross-sectional view showing a further alternative electrode assembly to the embodiment of FIG. 4I.
Figure 4N:
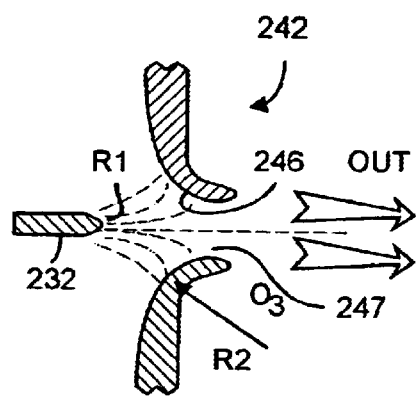
Figure 4N:
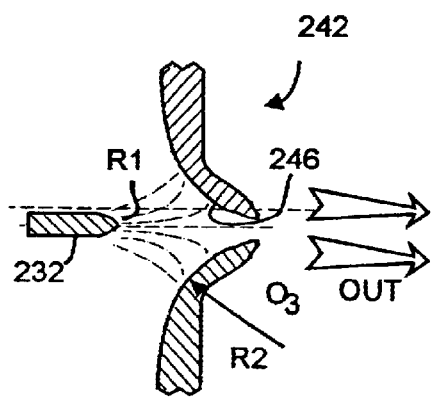
Figure 4N:
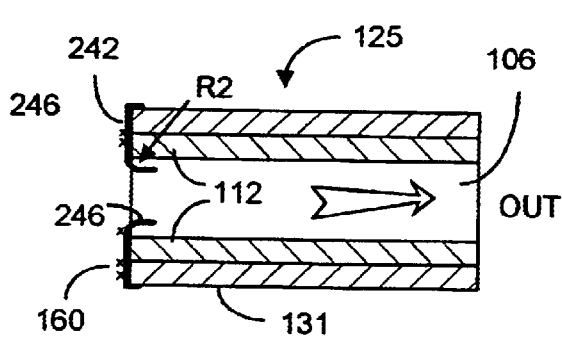
Figure 4N:
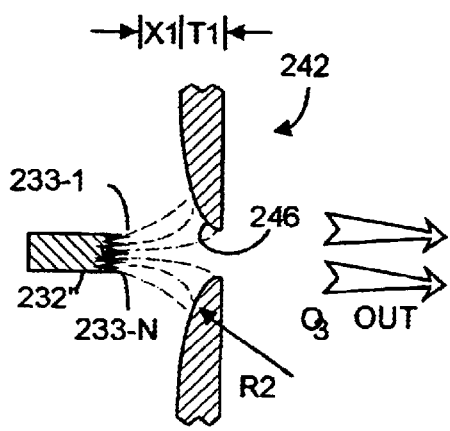

In FIG. 4N, one or more pointed electrodes 232 is replaced by a conductive block 232" of carbon fibers, the block having a distal surface in which projecting fibers 233-1, . . . 233-N take on the appearance of a "bed of nails". The projecting fibers can each act as an emitting electrode and provide a plurality of emitting surfaces. Over a period of time, some or all of the electrodes will literally be consumed, whereupon graphite block 232" will be replaced. Materials other than graphite may be used for block 232" providing the material has a surface with projecting conductive fibers such as 233-N.

It will be appreciated that applicants' first array pin-like or pointed electrodes may be utilized with the second array electrodes of FIGS. 4A–4H if desired. Further, applicants' second array annular ring-like electrodes may be utilized with the first array electrodes of FIGS. 4A–4H. For example, in modifications of the embodiments of FIGS. 4A–4H, each wire or columnar electrode 232 is replaced by a column of electrically series-connected pin electrodes (e.g., as shown in FIGS. 4I–4K), while retaining the second electrode arrays as depicted in these figures. By the same token, in other modifications of the embodiments of FIGS. 4A–4H, the first array electrodes can remain as depicted, but each of the second array electrodes 242 is replaced by a column of electrically series-connected ring electrodes (e.g., as shown in FIGS. 4I–4K).

As described, the net output of ions is influenced by placing a bias element (e.g., element 243) near the output stream and preferably near the downstream side of the second array electrodes. If no ion output were desired, such an element could achieve substantial neutralization. It will also be appreciated that the present invention could be adjusted to produce ions without producing ozone, if desired. In practice, increasing humidity of the output air by using a moistened member 112 will tend to decrease ozone content somewhat.

In summary, when operated from internal batteries, the present invention can provide several hours of clean air with safe amounts of ozone and, if desired, an increase in humidity of perhaps 10% to 20%. If desired, the air outflow may be augmented with other than water, for example an inhalant or other substance. If desired, the invention may be powered from an external source such as a motor vehicle 12 V battery. While the preferred embodiment includes two pair of electrodes, it will be appreciated that the present invention may be implemented with more or fewer electrodes.

Modifications and variations may be made to the disclosed embodiments without departing from the subject and spirit of the invention as defined by the following claims.

What is claimed is:

1. A personal electro-kinetic air transporter-conditioner, comprising:
    a housing defining at least one vent;
    a self-contained ion generator, disposed within said housing, said ion generator producing an air flow that contains at least one of ions and ozone that flows electrostatically from said vent; and
    means for increasing humidity of said air flow, disposed in said housing;
    wherein said ion generator includes:
        a high voltage generator outputting a signal whose duty cycle may be varied from about 10% to about 100%; and
        an electrode assembly comprising a first electrode array effectively coupled to a first output port of said generator, and a second electrode array effectively coupled to a second output port of said generator, wherein one said output port may be at a same potential as ambient air;
    wherein particulate matter in ambient air is electrostatically attracted to said second electrode array, and wherein said ion generator further creates ozone that flows electrostatically from said vent.

2. The personal transporter-conditioner of claim 1, wherein said high voltage generator has a characteristic selected from a group consisting of (a) said high voltage generator provides a first potential measurable relative to ground to said first electrode array and provides a second potential electrode array, and (b) said high voltage generator provides a first positive potential measurable relative to ground to said first electrode array and provides a second negative potential measurable relative to ground to said second electrode array.

3. The personal transporter-conditioner of claim 1, wherein:
    said first electrode array includes at least one electrode selected from a group consisting of (i) an electrically conductive tapered pin-shaped electrode, and (ii) a portion of conductive material having an end defining a plurality of projecting conductive fibers; and
    said second electrode array includes an electrically conductive ring-shaped electrode defining a central through opening surrounded by a collar region such that a surface of said second electrode array facing said first electrode array transitions smoothly and continuously into an interior surface of said collar region, said second electrode disposed coaxial with and in a downstream direction from an emitting end of an electrode in said first electrode array.

4. The personal transporter-conditioner of claim 3, wherein said first electrode array includes at least one said pin-shaped electrode, and said second electrode array has at east one characteristic selected from a group consisting of (i) said ring-shaped electrode defines in cross-section a tapered region terminating towards said central through opening, (ii) said ring-shaped electrode defines in cross-section a rounded region terminating towards said central through opening, (c) said ring-shaped electrode defines in cross-section a rounded profile terminating in said through opening, (d) a ratio of effective radius of said ring-shaped electrode to effective radius of said pin-shaped electrode exceeds about 15:1, (e) said pin-shaped electrode includes tungsten, (f) said pin-shaped electrode includes stainless steel, (g) said pin-shaped electrode includes stainless steel, (i) said collar region is cylindrical in cross-section.

5. The personal transporter-conditioner of claim 3, further including a second said second electrode array.

6. The personal transporter-conditioner of claim 1, wherein:
    said first electrode array includes at least one metal wire electrode; and
    said second electrode array includes at least two electrically conductive electrodes that in cross-section define a "U"-shape having a bulbous nose region and first and second trailing edge regions;
    the "U"-shaped electrodes being disposed such that said bulbous nose regions facing said metal wire electrode and are equidistant therefrom.

7. The personal transporter-conditioner of claim 6, wherein an electrode in said second electrode array has at least one characteristic selected from a group consisting of (i) a portion of one trailing edge region is longer than a remaining trailing edge region on said electrode, (ii) said trailing edge region defines at least one pointed projection facing downstream, and (iii) a ratio of effective radius of an electrode in said second electrode array to effective radius of said metal wire electrode exceeds about 15:1.

8. The personal transporter-conditioner of claim 1, wherein:
said first electrode array includes at least one metal wire electrode; and
said second electrode array includes at least two electrically conductive electrodes that in cross-section define a "L"-shape having a curved nose region;
the "L"-shaped electrodes being disposed such that said curved nose regions face said metal wire electrode and are equidistant therefrom;
wherein a ration of radius of one said "L"-shaped electrode to radius of said metal wire electrode exceeds about 15:1.

9. The personal transporter-conditioner of claim 1, wherein:
said first electrode array includes at least one metal wire electrode; and
said second electrode array includes at least two electrically conductive rod electrodes;
the rod electrodes being disposed such that said curved nose regions face said metal wire electrode and are equidistant therefrom;
wherein a ratio of radius of one said rod electrodes to radius of said metal wire electrode exceeds about 15:1.

10. The personal transporter-conditioner of claim 1, further including a bias electrode for determining net polarity of ions generated by said transporter-conditioner.

11. A personal transporter-conditioner comprising:
a housing defining at least one vent;
a self-contained ion generator, disposed within said housing, said ion generator producing an air flow that contains at least one of ions and ozone that flows electrostatically from said vent;
means for increasing humidity of said air flow, disposed in said housing; and
means for turning-on said ion generator when said personal transporter-conditioner is vibrated;
wherein said means for turning-on includes a container retaining at least one BB, and a transducer adjacent said container; and
wherein vibrations cause said BB to move within said container and generate at least one of noise and force that is detected by said transducer.

12. A personal electro-kinetic air transporter-conditioner, comprising:
a housing defining at least one vent; and
a self-contained ion generator, disposed within said housing, and including:
a high voltage generator outputting a signal whose duty cycle may be varied from about 10% to about 100%;
an electrode assembly comprising a first electrode array effectively coupled to a first output port of said generator, and a second electrode array effectively coupled to a second output port of said generator, wherein one said output port may be at a same potential as ambient air;
said ion generator producing an air flow that contains at least one of ions and ozone that flows electrostatically from said vent; and
means for increasing humidity of said air flow, disposed in said housing;
wherein particulate matter in ambient air is electrostatically attracted to said second electrode array, and wherein said ion generator further creates ozone that flows electrostatically from said vent.

13. The personal transporter-conditioner of claim 12, wherein said high voltage generator has a characteristic selected from a group consisting of (a) said high voltage generator provides a first potential measurable relative to ground to said first electrode array and provides a second potential measurable relative to ground to said second electrode array, and (b) said high voltage generator provides a first positive potential measurable relative to ground to said first electrode array and provides a second negative potential measurable relative to ground to second electrode array.

14. The personal transporter-conditioner of claim 13, wherein:
said first electrode array includes at least one electrode selected from a group consisting of (i) an electrically conductive tapered pin-shaped electrode, (ii) an electrically conductive pointed electrode, and (iii) a portion of conductive material having an end defining a plurality of projecting conductive fibers; and
said second electrode array includes an electrically conductive ring-shaped electrode defining a central through opening surrounded by a collar region such that a surface of said second electrode array facing said first electrode array transitions smoothly and continuously into an interior surface of said collar region, said second electrode disposed coaxial with and in a downstream direction from an emitting end of an electrode in said first electrode array.

15. The personal transporter-conditioner of claim 12, further including a bias electrode for determining net polarity of ions generated by said transporter-conditioner.

16. A personal transporter-conditioner, comprising:
a housing defining at least one vent;
a self-contained ion generator, disposed within said housing, and including:
a high voltage generator;
an electrode assembly comprising a first electrode array effectively coupled to a first output port of said generator, and a second electrode array effectively coupled to a second output port of said generator, wherein one said output port may be at a same potential as ambient air;
said ion generator producing an air flow that contains at least one of ions and ozone that flows electrostatically from said vent; and
means for increasing humidity of said air flow, disposed in said housing;
wherein particulate matter in ambient air is electrostatically attracted to said second electrode array, and wherein said ion generator further creates ozone that flows electrostatically from said vent;
wherein said means for increasing humidity includes a member of water-retaining material disposed adjacent said vent, said material being selected from a group consisting of(i) material having a polyethylene base, and (ii) foam material.

17. A personal transporter-conditioner, comprising:
a housing defining at least one vent;
a self-contained ion generator, disposed within said housing, and including:
a high voltage generator;
an electrode assembly comprising a first electrode array effectively coupled to a first output port of said generator, and a second electrode array effectively coupled to a second output port of said generator, wherein one said output port may be at a same potential as ambient air;

said ion generator producing an air flow that contains at least one of ions and ozone that flows electrostatically from said vent;

means for increasing humidity of said air flow, disposed in said housing; and means for turning-on said ion generator when said personal transporter-conditioner is vibrated, said means for turning-on including at least one means selected from (i) a sound detector to detect ambient noise, and (ii) a container retaining at least one BB, and a transducer adjacent said container wherein vibrations cause said BB to move within said container and generate at least one of noise and force that is detected by said transducer;

wherein particulate matter in ambient air is electrostatically attracted to said second electrode array, and wherein said ion generator further creates ozone that flows electrostatically from said vent.

18. A personal electro-kinetic air transporter-conditioner, comprising:

a housing defining an intake vent and an outlet vent;

a self-container ion generator disposed in said housing, said ion generator including:

an electrode assembly comprising a first electrode array and a second electrode array; and a high voltage generator that provides a voltage difference between said first electrode array and said second electrode array; and a moisture retaining material adjacent said outlet vent;

wherein said ion generator produces an air flow from said intake vent to said outlet vent, and wherein said moisture retaining material increases humidity of said air flow.

19. The personal electro-kinetic air transporter-conditioner of claim 18, wherein:

said first electrode array includes at least one electrode that has a base and an apex, said base being wider than said apex, and said apex aimed generally toward said second electrode array;

said second electrode array including at least one electrically conductive member through which there is defined an opening disposed generally in front of said apex; and said moisture retaining material defining a further opening disposed generally in front of said opening of said second electrode array.

20. The personal electro-kinetic air transporter-conditioner of claim 19, wherein:

said first electrode array is located closer to the intake vent than to the outlet vent;

said second electrode array is located closer to the outlet vent than to the inlet vent; and said moisture retaining material is located between said second electrode array and said outlet vent.

21. The personal electro-kinetic air transporter-conditioner of claim 20, wherein the moisture retaining material has a cylindrical shape through which said further opening is defined.

22. The personal electro-kinetic air transporter-conditioner of claim 21, wherein a diameter of said further opening defined in said moisture retaining material is greater than a diameter of said opening of said second electrode.

23. A personal transporter-conditioner, comprising:

a housing;

a self-contained ion generator, disposed within said housing, and including:

a high voltage generator;

an electrode assembly comprising a first electrode array effectively coupled to a first output port of said generator, and a second electrode array effectively coupled to a second output port of said generator, wherein one said output port may be at a same potential as ambient air;

said ion generator producing an air flow that contains at least one of ions and ozone;

a container retaining at least one small object, wherein vibrations cause said small object to move within said container and generate at least one of noise and force; and a transducer to detect at least one of noise and force that is generated when said small object moves within said container;

wherein said ion generator turns-on in response to said transducer detecting at least one of noise and force.

24. The personal electro-kinetic air transporter-conditioner of claim 23, further comprising:

a moisture retaining material to increase humidity of said air flow.

* * * * *

UNITED STATES PATENT AND TRADEMARK OFFICE
CERTIFICATE OF CORRECTION

PATENT NO. : 6,632,407 B1  Page 1 of 1
DATED : October 14, 2003
INVENTOR(S) : Shek Fai Lau and Charles E. Taylor It is certified that error appears in the above-identified patent and that said Letters Patent is hereby corrected as shown below:

Column 16,
Line 34, please delete "east" and insert therefor -- least --.
Line 34, please delete "(i)" and insert therefor -- (a) --.
Line 36, please delete "(ii)" and insert therefor -- (b) --.
Lines 44 and 45, please delete "(g) said pin-shpaed electrode includes  stainless steel,".
Line 45, please delete "(i)" and insert therefor -- (g) --.

Signed and Sealed this

Ninth Day of March, 2004

JON W. DUDAS
*Acting Director of the United States Patent and Trademark Office*